United States Patent
Choi et al.

(10) Patent No.: US 10,972,241 B2
(45) Date of Patent: Apr. 6, 2021

(54) METHOD FOR RECEIVING SRS CONFIGURATION INFORMATION AND TERMINAL THEREFOR

(71) Applicant: LG Electronics Inc., Seoul (KR)

(72) Inventors: Kukheon Choi, Seoul (KR); Jiwon Kang, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/540,709

(22) Filed: Aug. 14, 2019

(65) Prior Publication Data

US 2019/0372734 A1 Dec. 5, 2019

Related U.S. Application Data

(63) Continuation of application No. PCT/KR2018/001979, filed on Feb. 14, 2018.

(60) Provisional application No. 62/458,576, filed on Feb. 14, 2017.

(51) Int. Cl.
*H04L 5/00* (2006.01)
*H04L 25/02* (2006.01)

(52) U.S. Cl.
CPC ........ *H04L 5/0048* (2013.01); *H04L 25/0224* (2013.01)

(58) Field of Classification Search
CPC .......... H04L 2012/5608; H04W 84/12; H04W 88/08; H04W 80/04; H04W 84/18; H04W 88/06; H04W 74/08; H04W 8/26; H04W 76/00; H04W 84/08; H04W 76/02; H04W 74/0816; H04W 74/04; H04W 72/0406; H04W 72/04; H04B 7/2123; H04B 7/212

USPC .... 370/310.2, 328, 338, 349, 322, 329, 341, 370/348
See application file for complete search history.

(56) References Cited

U.S. PATENT DOCUMENTS

| | | | |
|---|---|---|---|
| 9,537,547 B1* | 1/2017 | Kazeminejad | H04B 7/0421 |
| 2013/0114564 A1* | 5/2013 | Ogawa | H04L 5/0012 370/330 |
| 2013/0156014 A1* | 6/2013 | Kim | H04L 5/0051 370/336 |
| 2014/0003262 A1* | 1/2014 | He | H04W 52/383 370/252 |

(Continued)

FOREIGN PATENT DOCUMENTS

| | | |
|---|---|---|
| JP | 2012521173 | 9/2012 |
| JP | 2016514406 | 5/2016 |

(Continued)

OTHER PUBLICATIONS

PCT International Search Report and Written Opinion in International Application No. PCT/KR2018/001979, dated Jun. 7, 2018, 21 pages (with English translation).

(Continued)

*Primary Examiner* — Brenda H Pham
(74) *Attorney, Agent, or Firm* — Fish & Richardson P.C.

(57) ABSTRACT

A method for receiving SRS configuration information by a terminal may comprise the steps of: receiving, from a base station, the SRS configuration information including information on the number of simultaneously transmissible SRS resources configured for the terminal; and performing SRS transmission on the basis of the SRS configuration information.

14 Claims, 25 Drawing Sheets

(a) Aperiodic SRS transmission with N, P, M, Q by DCI (b) Aperiodic SRS transmission with P, M, Q by DCI (N in high layer transmission)

(56) References Cited

U.S. PATENT DOCUMENTS

2014/0241242 A1* 8/2014 Josiam ............... H04W 88/02
370/328

FOREIGN PATENT DOCUMENTS

| KR | 20110119502 | 11/2011 |
| --- | --- | --- |
| KR | 101469337 | 12/2014 |
| KR | 20150042682 | 4/2015 |
| KR | 101639810 | 7/2016 |
| KR | 20160093108 | 8/2016 |
| KR | 101667264 | 10/2016 |
| KR | 20160146947 | 12/2016 |
| WO | WO2011123805 | 10/2011 |
| WO | WO2011135788 | 7/2013 |

OTHER PUBLICATIONS

Huawei, HiSilicon, "Details on SRS switching for UEs with multiple antennas," R1-1608590, 3GPP TSG RAN WG1 Meeting #86bis, Lisbon, Portugal, Oct. 10-14, 2016, 3 pages.

Ericsson, "On SRS design," R1-1703222, 3GPP TSG-RAN WG1 #88, Athens, Greece, Feb. 13-17, 2017, 9 pages.

Panasonic, "Discussion on SRS transmission for NR," R1-1703453, 3GPP TSG RAN WG1 Meeting #88, Athens, Greece, Feb. 13-17, 2017, 4 pages.

Catt, "Consideration on SRS transmission for NR," R1-1608779, 3GPP TSG RAN WG1 Meeting #86bis, Lisbon, Portugal, Oct. 10-14, 2016, 2 pages.

Japanese Office Action in Japanese Application No. 2019-542658, dated Oct. 20, 2020, 4 pages (with English translation).

LG Electronics, "Considerations on NR SRS design," R1-1702465, 3GPP TSG RAN WG1 Meeting #88, Athens, Greece, dated Feb. 13-17, 2017, 4 pages.

LG Electronics, "Discussion on UL beam management," R1-1702454, 3GPP TSG RAN WG1 Meeting #88, Athens, Greece, dated Feb. 13-17, 2017, 5 pages.

NTT Docomo, Inc., "Workplan for Study on NR Access Technology," R1-1702795, 3GPP TSG RAN WG1 Meeting #88, Athens, Greece, dated Feb. 13-17, 2017, 136 pages.

Extended European Search Report in European Application No. 18753571.1, dated Dec. 3, 2020, 10 pages.

Huawei, HiSilicon, "UL SRS Design for CSI Acquisition and Beam Management," R1-1611678, 3GPP TSG RAN WG1 Meeting #87, Reno, USA, dated Nov. 14-18, 2016, 5 pages.

* cited by examiner

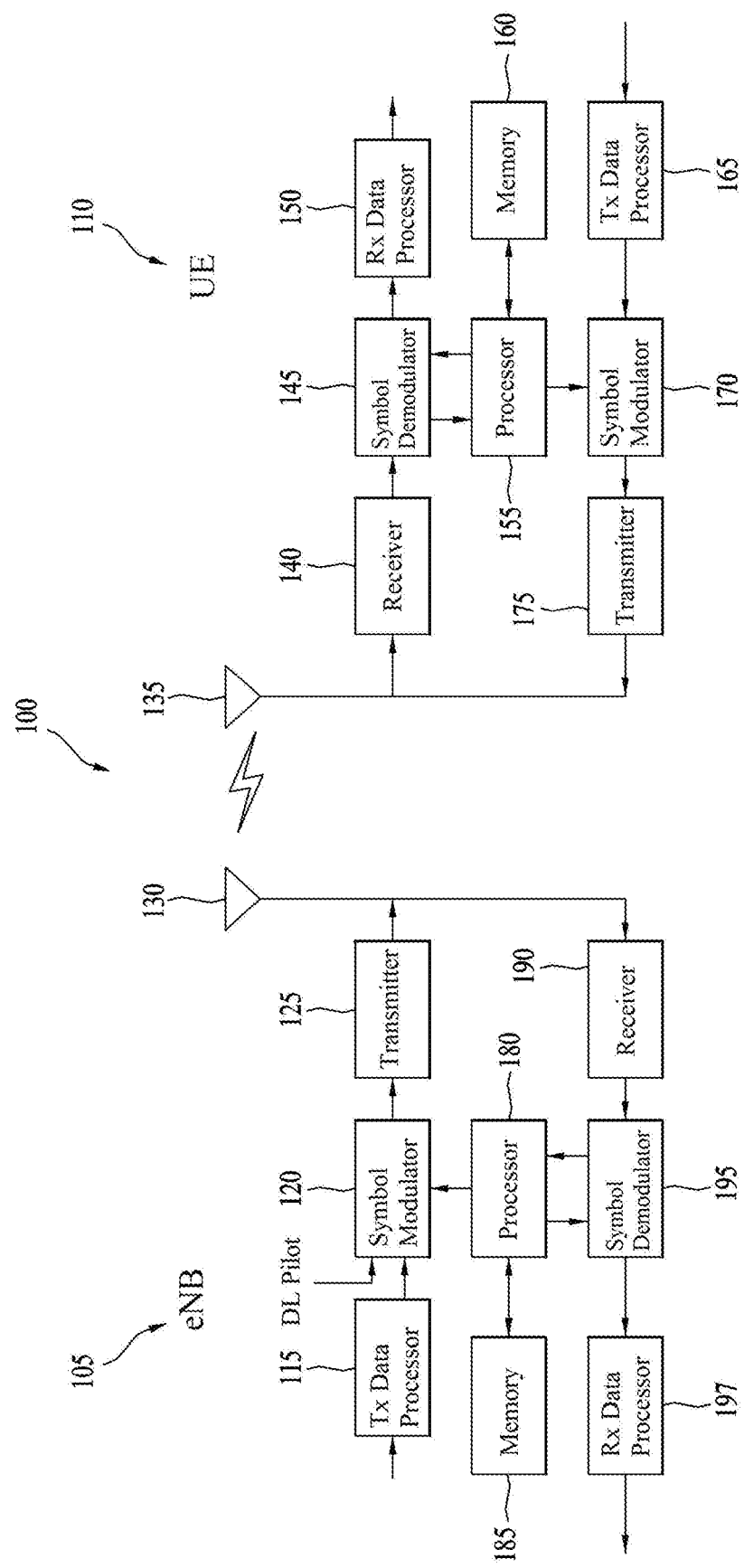

FIG. 9
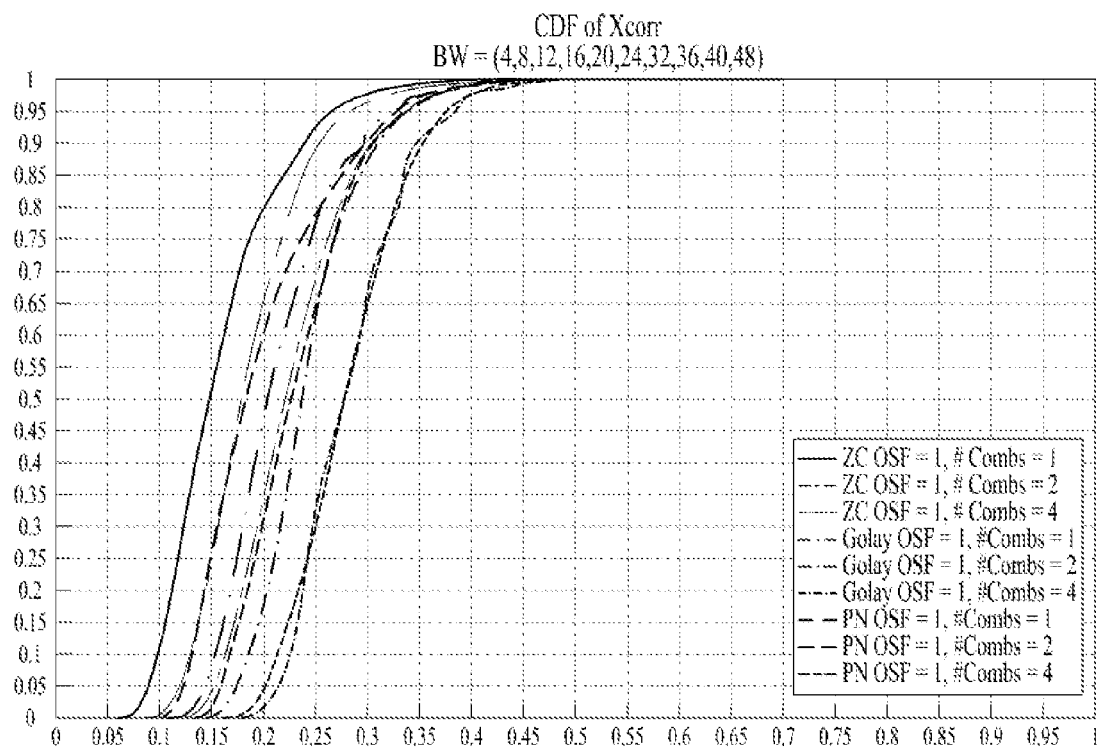
(a) cross-correlation Evaluation
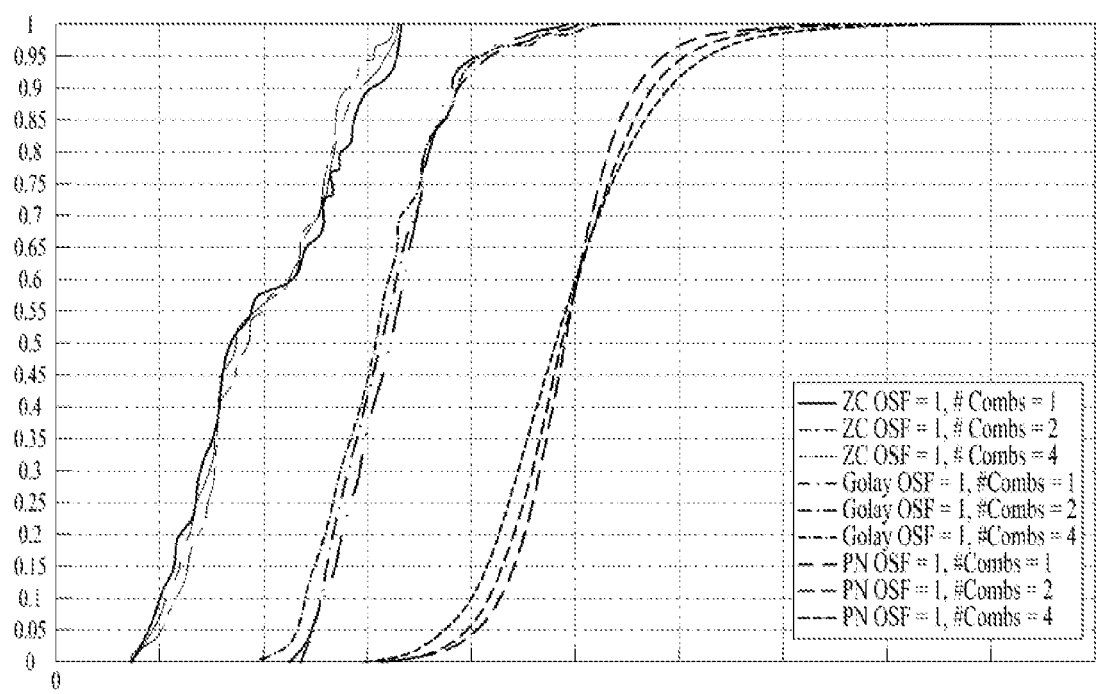
(b) cubic-Metric Evaluation

FIG. 11

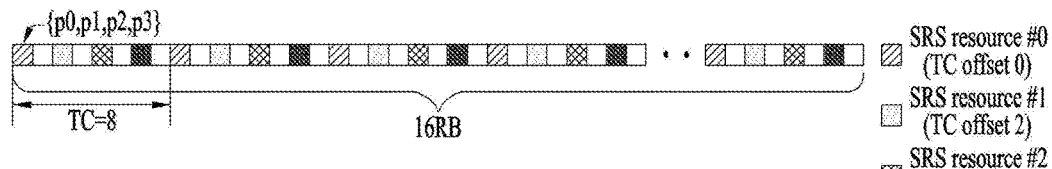

(a) Example of Configuration of 4 SRS Resources and 4 Ports Per Resource (TC=8, BW=16RB)

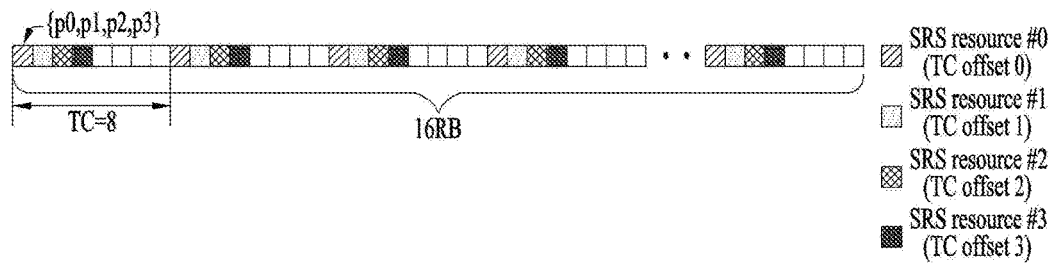

(b) Example of Configuration of 4 SRS Resources and Sequential Assignment of TC Offsets to Resources(TC=8, BW=16RB)

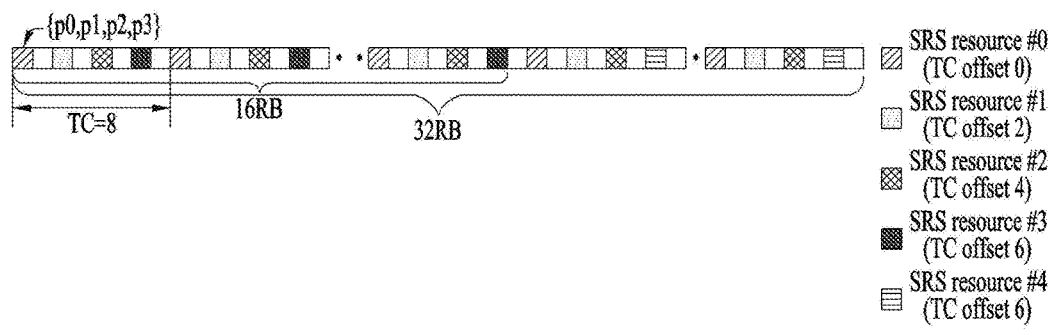

(c) Example of Configuration of 5 SRS Resources and Deployment of Resources of Different Lengths (TC=8, BW=32RB)

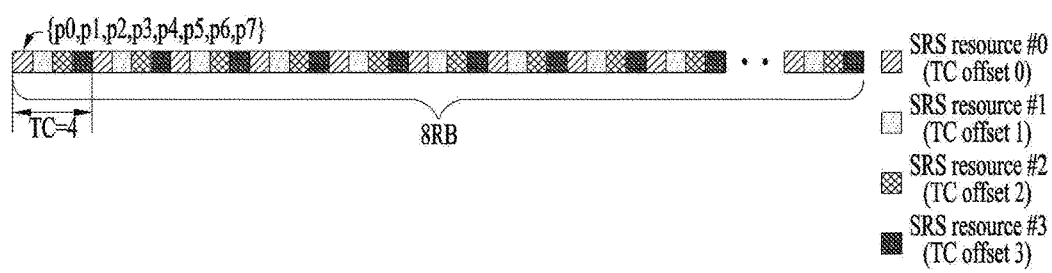

(d) Example of Configuration of 4 SRS Resources and 8 Ports Per Resource (TC=4, BW=8RB)

FIG. 14
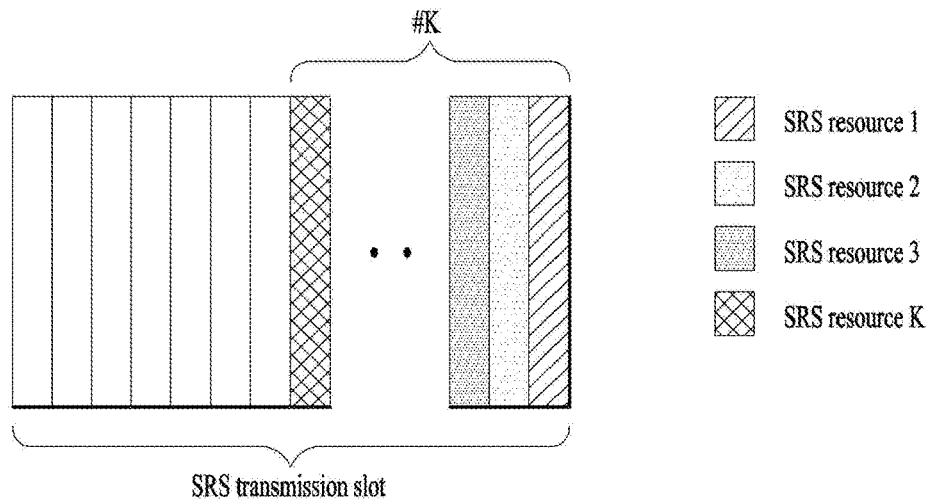
(a) Example of Resource Setting in Alt 1
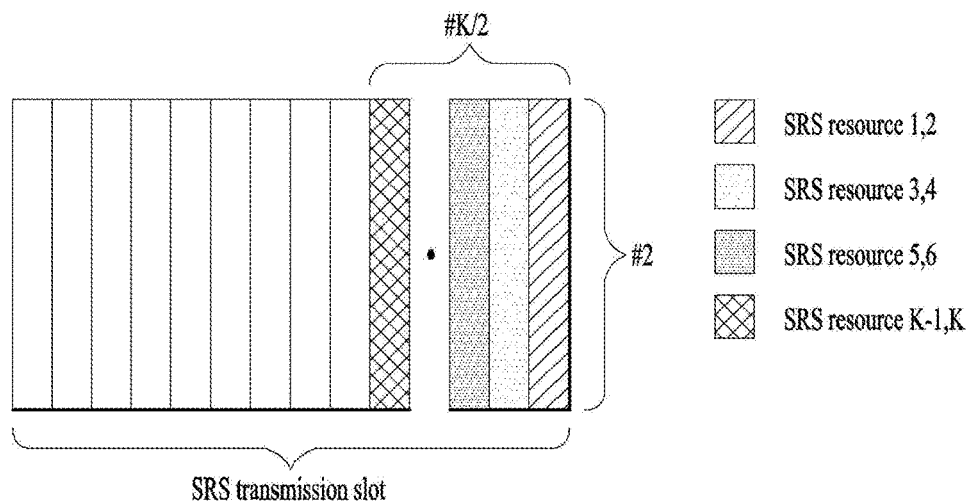
(b) Example of Resource Setting in Alt 2 (L=2, J=K/2)
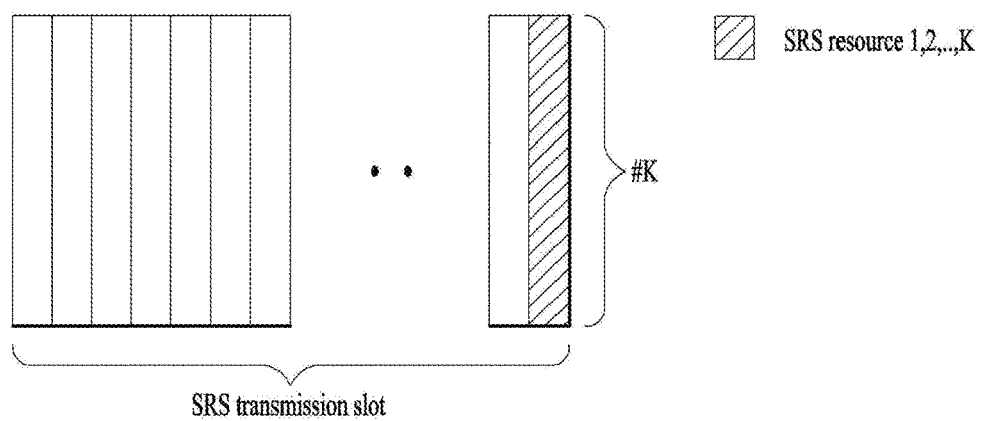
(c) Example of Resource Setting in Alt 3

FIG. 17
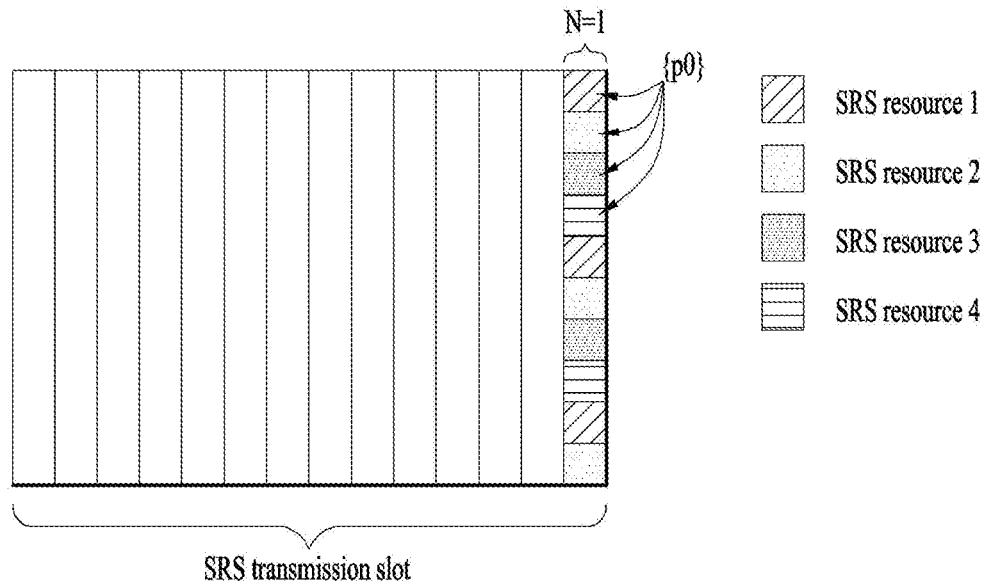
(a) Configuration of 4 SRS Resources
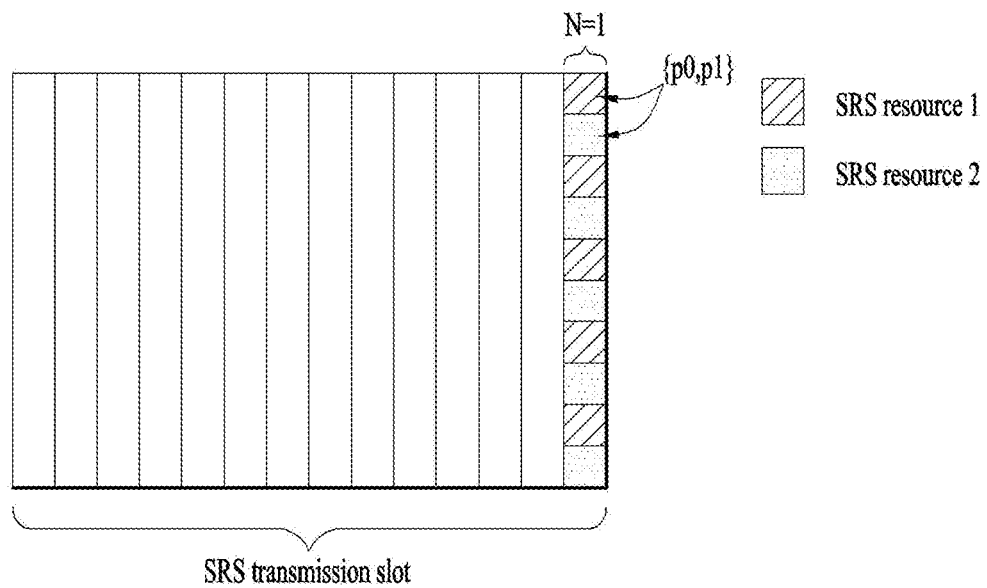
(b) Configuration of 2 SRS Resources

FIG. 18
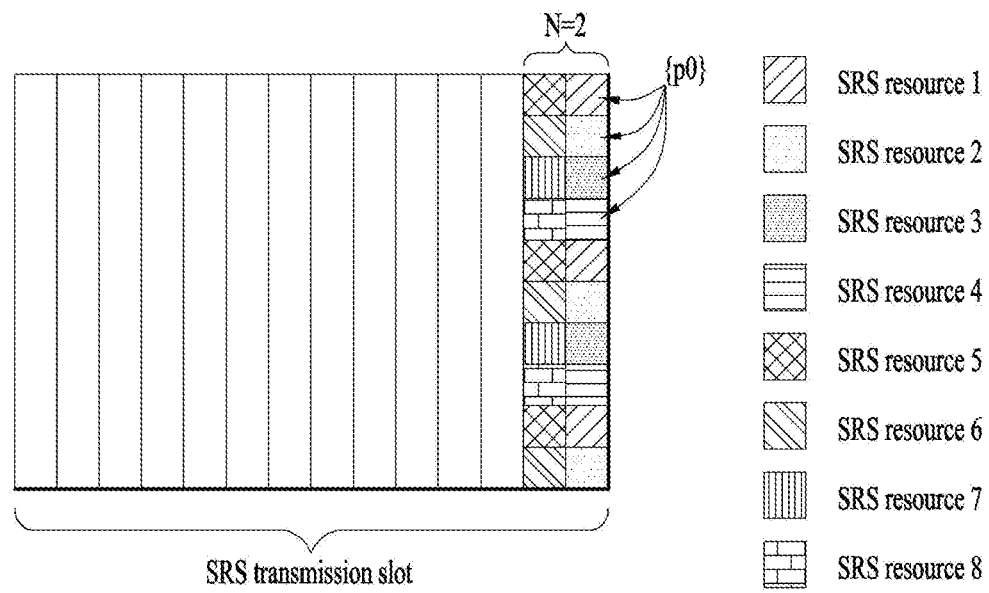
(a) Configuration of 4 SRS Resources Per Symbol
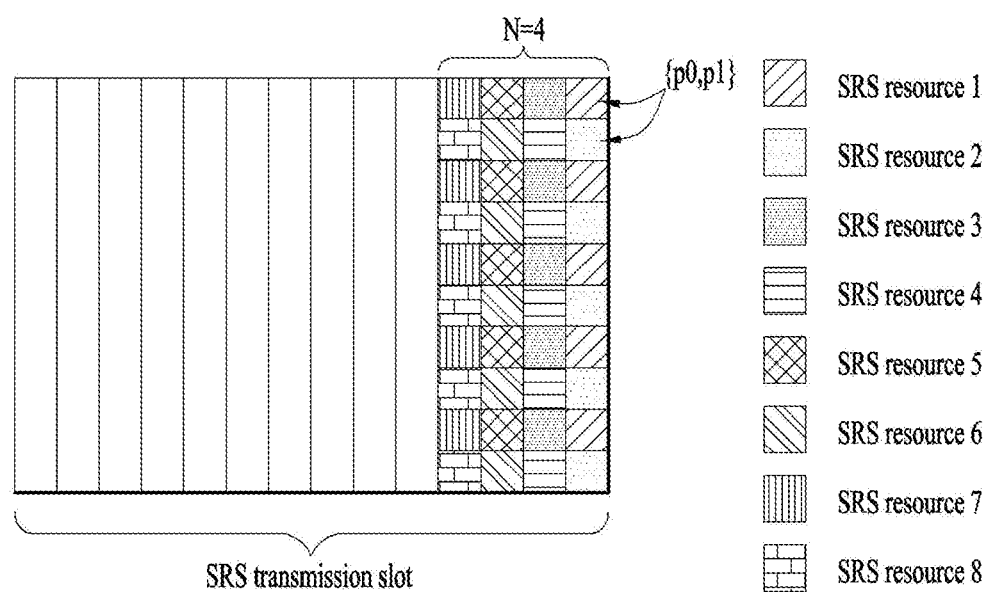
(b) Configuration of 2 SRS Resources Per Symbol FIG. 23
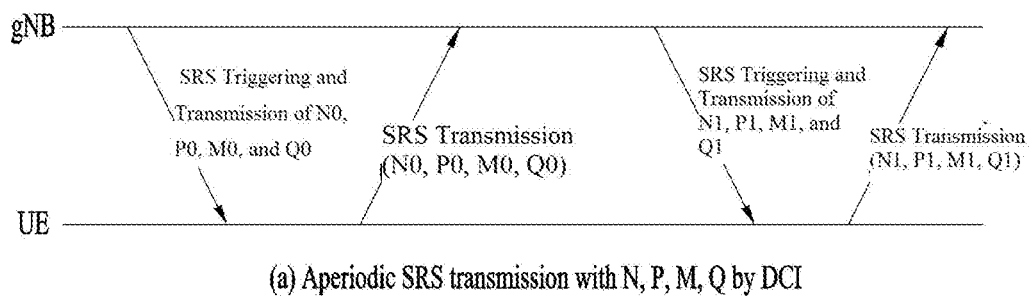
(a) Aperiodic SRS transmission with N, P, M, Q by DCI
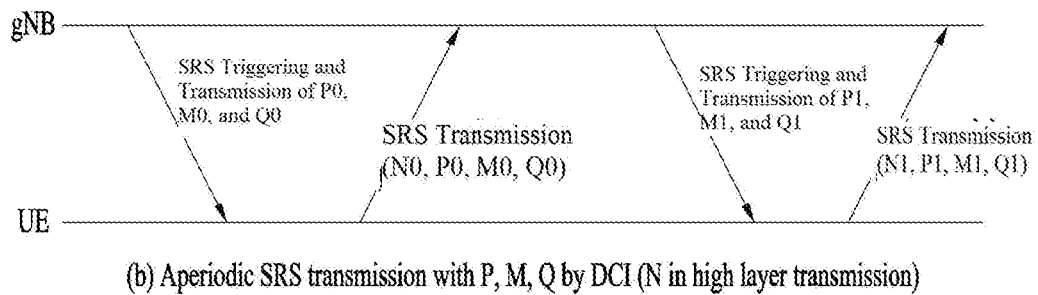
(b) Aperiodic SRS transmission with P, M, Q by DCI (N in high layer transmission)

METHOD FOR RECEIVING SRS CONFIGURATION INFORMATION AND TERMINAL THEREFOR

CROSS-REFERENCE TO RELATED APPLICATIONS

This application is a continuation of International Application No. PCT/KR2018/001979, filed on Feb. 14, 2018, which claims the benefit of U.S. Provisional Application No. 62/458,576, filed on Feb. 14, 2017. The disclosures of the prior applications are incorporated by reference in their entirety.

TECHNICAL FIELD

The present disclosure relates to wireless communication, and more particularly, to a method of receiving sounding reference signal (SRS) configuration information and a user equipment (UE) therefor.

BACKGROUND ART

As the introduction of a new radio access technology (New RAT) system leads to demands for larger communication capacities in more communication devices, there is a need for enhanced mobile broadband communication, relative to legacy RAT.

Massive machine type communication (MTC) that provides various services at any time in any place by interconnecting multiple devices and things is also one of important issues to be addressed for the future-generation communication. In addition, a communication system design is under discussion, in which services/UEs sensitive to reliability and latency are considered. As such, New RAT is intended to provide services in consideration enhanced mobile broadband communication (eMBB), massive MTC (mMTC), and ultra-reliable and low-Latency communication (URLLC).

DISCLOSURE

Technical Problem

An aspect of the present disclosure devised to solve the conventional problem is to provide a method of receiving sounding reference signal (SRS) configuration information.

Another aspect of the present disclosure is to provide a user equipment (UE) for receiving SRS configuration information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving sounding reference signal (SRS) configuration information by a user equipment (UE) may include receiving, from a base station (BS), SRS configuration information including information about the number of SRS resources available for simultaneous transmission, configured for the UE, and performing an SRS transmission based on the SRS configuration information. the SRS configuration information may further include at least one of information about the number of symbols for SRS transmission in one slot, information about the positions of the symbols for SRS information in the one slot, information about the number of SRS symbols mapped to the same beam, information indicating whether the same beam is applied to the one slot, for the SRS transmission, information about the number of SRS resources in one SRS symbol, or information about the number of mapped ports per SRS resource.

The method may further include transmitting, to the BS, UE capability information including information about the number of SRS resources available for simultaneous transmission, supported by the UE, and the number of SRS resources available for simultaneous transmission, configured for the UE may be determined based on the UE capability information. The method may further include transmitting, to the BS, UE capability information further including at least one of information about the number of SRS ports available for simultaneous transmission at the UE, information about the number of uplink beams available for simultaneous transmission at the UE, information about the number of panels of the UE, or information about the number of transceiver units (TXRUs) at the UE, and the SRS configuration information may be determined based on the UE capability information.

The SRS configuration information may further include information indicating an SRS resource multiplexing scheme. The indicated SRS resource multiplexing scheme may be determined based on UE capability information of the UE. The UE capability information may include information about a maximum number of transmission antenna ports for the SRS transmission, and the SRS resource multiplexing scheme corresponding to the maximum number of transmission antenna ports. The SRS configuration information may further include information related to an SRS frequency hopping pattern configured for the UE.

The method may further include, if an SRS configuration capability set in the SRS configuration information by the BS is higher than a UE capability of the UE, transmitting a message indicating that the BS has set a wrong SRS configuration to the BS. The method may further include a message requesting a UE-desired SRS transmission configuration to the BS.

In another aspect of the present disclosure, a UE for receiving SRS configuration information may include a receiver, a transmitter, and a processor. The processor may be configured to control the receiver to receive, from a BS, SRS configuration information including information about the number of SRS resources available for simultaneous transmission, configured for the UE, and to control the transmitter to perform an SRS transmission based on the SRS configuration information.

The processor may be configured to control the transmitter to transmit, to the BS, UE capability information including information about the number of SRS resources available for simultaneous transmission, supported by the UE, and the number of SRS resources available for simultaneous transmission, configured for the UE may be determined based on the UE capability information. The SRS configuration information may further include at least one of information about the number of symbols for SRS transmission in one slot, information about the positions of the symbols for SRS information in the one slot, information about the number of SRS symbols mapped to the same beam, information indicating whether the same beam is applied to the one slot, for the SRS transmission, information about the number of SRS resources in one SRS symbol, or information about the number of mapped ports per SRS resource.

The processor may be configured to control the transmitter to transmit, to the BS, UE capability information further including at least one of information about the number of SRS ports available for simultaneous transmission at the UE, information about the number of uplink beams available for simultaneous transmission at the UE, information about the number of panels of the UE, or information about the number of transceiver units (TXRUs) at the UE, and the SRS configuration information may be determined based on the UE capability information.

If an SRS configuration capability set in the SRS configuration information by the BS is higher than a UE capability of the UE, the processor may be configured to control the transmitter to transmit a message indicating that the BS has set a wrong SRS configuration to the BS.

Advantageous Effects

According to the embodiments of the present disclosure, SRS resources may be mapped to SRS ports according to the capability (e.g., beamforming capability) of an NR UE. An SRS configuration may be set adaptively according to parameters required for the SRS configuration, an SRS configuration method (periodic, aperiodic, or semi-persistent SRS configuration), and an SRS usage (uplink (UL) beam management or UL channel estimation).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a block diagram illustrating an evolved Node B (eNB) 105 and a user equipment (UE) in a wireless communication system 100;

FIG. 9 is a diagram illustrating cross-correlation evaluation and cubic-metric evaluation of Zadoff-Chu (ZC), Golay, and pseudo-noise (PN) sequences;

FIG. 11 is a diagram illustrating exemplary SRS resource configurations and port mappings in frequency;

FIG. 14 is a diagram illustrating SRS resource index settings (K>=1);

FIG. 17 is a diagram illustrating an exemplary case in which the maximum number of transmission beam ports at a UE is 4 and frequency division multiplexing (FDM) only is applied between SRS resources;

FIG. 18 is a diagram illustrating an exemplary case in which the maximum number of Tx beam ports at a UE is 4 and TDM and FDM are applied in combination between SRS resources;

FIG. 23 is a diagram illustrating exemplary transmission configurations for N, P, M, and Q values.

BEST MODE FOR CARRYING OUT THE INVENTION

Figure 2A:
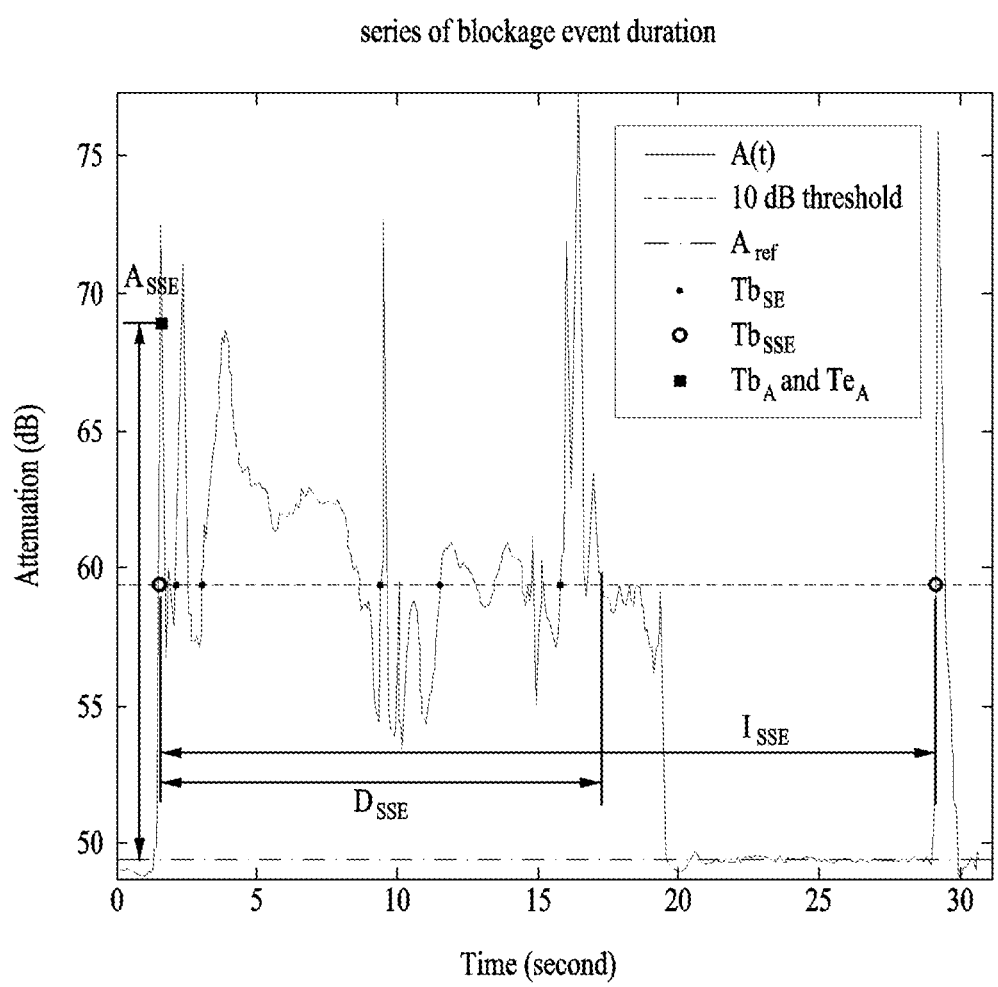
FIG. 2A is a diagram illustrating a series of block event duration in [Table 10], which is a meaningful blockage duration.

Reference will now be made in detail to the preferred embodiments of the present disclosure with reference to the accompanying drawings. The detailed description, which will be given below in conjunction with the accompanying drawings, is intended to explain exemplary embodiments of the present disclosure, rather than to show the only embodiments that can be implemented according to the disclosure. The following detailed description includes specific details in order to provide a thorough understanding of the present disclosure. However, it will be apparent to those skilled in the art that the present disclosure may be practiced without such specific details. For example, although the following description is given of the present disclosure in the context of $3^{rd}$ generation partnership project (3GPP) long term evolution (LTE), LTE-advanced (LTE-A), and $5^{th}$ generation (5G) systems, as exemplary mobile communication systems, the same thing applies to other mobile communication systems except for features inherent to the 3GPP LTE and LTE-A systems.

In some instances, known structures and devices are omitted or are shown in block diagram form, focusing on important features of the structures and devices, so as not to obscure the concept of the disclosure. Like reference numerals denote the same components throughout the specification.

In the disclosure, a terminal generically refers to a mobile or fixed user device, such as a user equipment (UE), a mobile station (MS), an advanced mobile station (AMS), and so on. Further a base station (BS) generically refers to any node at a network end, which communicates with a UE, such as a Node B, an evolved Node B (eNode B or eNB), an access point (AP), a gNode B, and so on.

In a mobile communication system, an MS or UE may receive information on downlink (DL) from a BS and transmit information on uplink (UL). The information transmitted or received by the UE includes data and various types of control information, and various physical channels are defined according to the types and usages of the information transmitted or received by the UE.

The technology as described hereinbelow may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), and so on. UTRA is a part of universal mobile telecommunications system (UMTS). 3GPP LTE is a part of evolved UMTS (E-UMTS) using E-UTRA, adopting OFDMA for DL and SC-FDMA for UL. LTE-A is an evolution of 3GPP LTE.

Specific terms as used herein are provided to help the understanding of the present disclosure. These specific terms may be replaced with other terms within the scope and spirit of the present disclosure.

FIG. 1 is a block diagram illustrating an eNB 105 and a UE 110 in a wireless communication system 100.

While one eNB 105 and one UE 110 are shown to simplify the wireless communication system 100, the wireless communication system 100 may include one or more eNBs and/or one or more UEs.

Referring to FIG. 1, the eNB 105 may include a transmission (Tx) data processor 115, a symbol modulator 120, a transmitter 125, a transmission/reception (Tx/Rx) antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 1305 a processor 155, a memory 160, a receiver 140, a symbol demodulator 155, and an Rx data processor 150. While each of the eNB 105 and the UE 110 is shown as having a single Tx/Rx antenna 130 or 135, the eNB 105 and the UE 110 each are provided with a plurality of Tx/Rx antennas. Accordingly, the eNB 105 and the UE 110 according to the present disclosure support a multiple input multiple output (MIMO) system. Further, the eNB 105 according to the present disclosure may support both of single user-multiple input multiple output (SU-MIMO) and multi-user-multiple input multiple output (MU-MIMO).

On DL, the Tx data processor 115 receives traffic data, subjects the received traffic data to formatting, encoding, interleaving, and modulation (or symbol mapping), and provides modulation symbols ("data symbols"). The symbol modulator 120 receives and processes the data symbols and pilot symbols and provides a symbol stream.

The symbol modulator 120 multiplexes the data and the pilot symbols and transmits the multiplexed signal to the transmitter 125. Each of the transmission symbols may be a data symbol, a pilot symbol, or a zero signal value. The pilot symbols may be transmitted consecutively during each symbol period. The pilot symbols may be frequency division multiplexing (FDM), orthogonal frequency division multiplexing (OFDM), time division multiplexing (TDM), or code division multiplexing (CDM) symbols.

The transmitter 125 may receive the symbol stream and convert the received symbol stream to one or more analog signals. Further, the transmitter 125 generates a DL signal suitable for transmission on a radio channel by adjusting the analog signals (e.g., by amplification, filtering, and frequency upconversion). The Tx antenna 130 then transmits the generated DL signal to a UE.

In the UE 110, the Rx antenna 135 receives a DL signal from an eNB and provides the received DL signal to the receiver 140. The receiver 140 adjusts the received signal (e.g., by filtering, amplification, and frequency downconversion), and acquires samples by digitizing the adjusted signal. The symbol demodulator 145 demodulates received pilot symbols and provides the demodulated pilot symbols to the processor 155, for channel estimation.

Further, the symbol demodulator 145 receives a frequency response estimate for the DL from the processor 155, acquires data symbol estimates (the estimates of transmitted data symbols) by performing data demodulation on received data symbols), and provides the data symbol estimates to the Rx data processor 150. The Rx data processor 150 recovers the transmitted data traffic by subjecting the data symbol estimates to demodulation (i.e., symbol demapping), deinterleaving, and decoding.

The processes of the symbol demodulator 145 and the Rx data processor 150 are complementary to the processes of the symbol modulator 120 and the Tx data processor 115, respectively.

On UL, in the UE 110, the Tx data processor 165 processes traffic data and provides data symbols. The symbol modulator 170 may receive, multiplex, and modulate the data symbols and provide a symbol stream to the transmitter 175. The transmitter 175 receives and processes the symbol stream, thereby generating a UL signal. The Tx antenna 135 then transmits the generated UL signal to the eNB 105.

In the eNB 105, the Rx antenna 130 receives the UL signal from the UE 110, and the receiver 190 acquires samples by processing the received UL signal. The symbol demodulator 195 processes these samples and provides estimates of the pilot symbols and data symbols received on the UL. The Rx data processor 197 recovers the traffic data transmitted by the UE 110 by processing the data symbol estimates.

The processors 155 and 180 in the UE 110 and the eNB 105 instruct (e.g., control, adjust, manage, and so on) operations of the UE 110 and the eNB 105, respectively. The processors 155 and 180 may be coupled to the memories 160 and 185 that store program codes and data. The memories 160 and 185 are coupled to the processors 155 and 180 and store an operating system (OS), applications, and general files.

The processors 155 and 180 may also be called controllers, microcontrollers, microprocessors, microcomputers, and the like. The processors 155 and 180 may be implemented in hardware, firmware, software, or any combinations thereof. In the implementation by hardware, application specific integrated circuits (ASICs), digital signal processors (DSPs), digital signal processing devices (DSPDs), programmable logic devices (PLDs), field programmable gate arrays (FPGAs), and the like may be provided in the processors 155 and 180.

If the embodiments of the present disclosure are implemented in firmware or software, the firmware or software may be implemented to include modules, procedures, or functions for performing the functions or operations of the present disclosure. The firmware or software configured to implement the present disclosure may be included in the processors 155 and 180 or may be stored in the memories 160 and 185 and executed by the processors 155 and 180.

The layers of radio interface protocols between a wireless network system (network) and a UE and an eNB may be classified into a first layer (L1), a second layer (L2), and a third layer (L3) based on the lowest three layers of the open system interconnection (OSI) model. The physical layer at L1 provides an information transfer service on a physical channel. The radio resource control (RRC) layer at L3 provides radio control resources between the UE and the network. The UE and the eNB may exchange RRC messages with the wireless communication network through the RRC layer.

While the processor 155 of the UE and the processor 180 of the eNB perform operations of processing signals and data except for the function of receiving or transmitting signals and a storage function in the UE 110 and the eNB 105, the processors 155 and 180 are not specified as performing operations, for the convenience of description. Even though the processors 155 and 180 are not specified as responsible for operations, it may be considered that the processors 155 and 180 perform operations such as data processing other than the signal transmission and reception function and the storage function.

A description will first be given of sounding reference signal or sounding reference symbol (SRS) transmission in the 3GPP LTE/LTE-A system, in [Table 1] below.

TABLE 1

A UE shall transmit Sounding Reference Symbol (SRS) on per serving cell SRS resources based on two trigger types: - trigger type 0: higher layer signalling - trigger type 1: DCI formats 0/4/1A for FDD and TDD and DCI formats 2B/2C/2D for TDD. In case both trigger type 0 and trigger type 1 SRS transmissions would occur in the same subframe in the same serving cell, the UE shall only transmit the trigger type 1 SRS transmission. A UE may be configured with SRS parameters for trigger type 0 and trigger type 1 on each serving cell. The following SRS parameters are serving cell specific and semi-statically configurable by higher layers for trigger type 0 and for trigger type 1. - Transmission comb $\overline{k}_{TC}$, as defined in subclause 5.5.3.2 of [3] for trigger type 0 and each configuration of trigger type 1 - Starting physical resource block assignment $n_{RRC}$, as defined in subclause 5.5.3.2 of [3] for trigger type 0 and each configuration of trigger type 1 - duration: single or indefinite (until disabled), as defined in [11] for trigger type 0 -srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$, and SRS subframe offset $T_{SRS,1}$, as defined in Table 8.2-4 and Table 8.2-5 trigger type 1 - SRS bandwidth $B_{SRS}$, as defined in subclause 5.5.3.2 of [3] for trigger type 0 and each configuration of trigger type 1 - Frequency hopping bandwidth, $b_{hop}$, as defined in subclause 5.5.3.2 of [3] for trigger type 0 - Cyclic shift $n_{SRS}^{CS}$, as defined in subclause 5.5.3.1 of [3] for trigger type 0 and each configuration of trigger type 1 - Number of antenna ports $N_p$ for trigger type 0 and each configuration of trigger type 1For trigger type 1 and DCI format 4 three sets of SRS parameters, srs- ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'. A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

[Table 2] illustrates SRS request values for trigger type 1 in DCI format 4 in the 3GPP LTE/LTE-A system.

TABLE 2

| Value of SRS request field | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

[Table 3] gives a further description of SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3]. The serving cell specific SRS transmission sub-frames are configured by higher layers. The allowable values are given in subclause 5.5.3.3 of [3]. For a TDD serving cell, SRS transmission can occur in UpPTS and uplink subframes of TABLE 3-continued the UL/DL configuration indicated by the higher layer parameter subframeAssignment for the
serving cell. When closed-loop UE transmit antenna selected is enabled for a given serving cell
for a UE that supports transmit antenna selection, the index $a(n_{SRS})$, of the UE antenna that
transmits the SRS at time $n_{SRS}$ is given by $a(n_{SRS}) = n_{SRS}$ mod 2, for both partial and full sounding
bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when K is even} \\ n_{SRS} \bmod 2 & \text{when K is odd} \end{cases},$$

$$\beta = \begin{cases} 1 & \text{where K mod } 4 = 0 \\ 0 & \text{otherwise} \end{cases}$$

when frequency hopping is enabled (i.e. $b_{hop} < B_{SRS}$), where values $B_{SRS}$, $b_{hop}$, $N_b$, and $n_{SRS}$ are given in
subclause 5.5.3.2 of [3], and $$K = \prod_{b'=b_{hop}}^{B_{SRS}} N_{b'} \text{ (where } N_{b_{hop}} = 1 \text{ regardless of the } N_b \text{ value)},$$

except when a single SRS transmission is configured for the UE. If a UE is configured with more than
one serving cell, the UE is not expected to transmit SRS on different antenna ports simultaneously.
A UE may be configured to transmit SRS on Np antenna ports of a serving cell where Np may be configured
by higher layer signalling. For PUSCH transmission mode 1 $N_p \in \{0, 1, 2, 4\}$ and for PUSCH
transmission mode 2 $N_p \in \{0, 1, 2\}$ with two antenna ports configured for PUSCH and $N_p \in \{0, 1, 4\}$
with 4 antenna ports configured for PUSCH. A UE configured for SRS transmission on multiple
antenna ports of a serving cell shall transmit SRS for all the configured transmit antenna ports
within one SC-FDMA symbol of the same subframe of the serving cell. The SRS transmission
bandwidth and starting physical resource block assignment are the same for all the configured
antenna ports of a given serving cell. A UE not configured with multiple TAGs shall not transmit
SRS in a symbol whenever SRS and PUSCH transmissions happen to overlap in the same
symbol. For TDD serving cell, when one SC-FDMA symbol exists in UpPTS of the given
serving cell, it can be used for SRS transmission. When two SC-FDMA symbols exist in UpPTS
of the given serving cell, both can be used for SRS transmission and for trigger type 0 SRS both
can be assigned to the same UE. If a UE is not configured with multiple TAGs, or if a UE is
configured with multiple TAGs and SRS and PUCCH format 2/2a/2b happen to coincide in the
same subframe in the same serving cell, -The UE shall not transmit type 0 triggered SRS
whenever type 0 triggered SRS and PUCCH format 2/2a/2b transmissions happen to coincide in
the same subframe; -The UE shall not transmit type 1 triggered SRS whenever type 1 triggered
SRS and PUCCH format 2a/2b or format 2 with HARQ-ACK transmissions happen to coincide
in the same subframe; -The UE shall not transmit PUCCH format 2 without HARQ-ACK
whenever type 1 triggered SRS and PUCCH format 2 without HARQ-ACK transmissions
happen to coincide in the same subframe. If a UE is not configured with multiple TAGs, or if a
UE is configured with multiple TAGs and SRS and PUCCH happen to coincide in the same
subframe in the same serving cell, -The UE shall not transmit SRS whenever SRS transmission
and PUCCH transmission carrying HARQ-ACK and/or positive SR happen to coincide in the
same subframe if the parameter ackNackSRS-SimultaneousTransmission is FALSE; -For FDD-
TDD and primary cell frame structure 1, the UE shall not transmit SRS in a symbol whenever
SRS transmission and PUCCH transmission carrying HARQ-ACK and/or positive SR using
shortened format as defined in subclauses 5.4.1 and 5.4.2A of [3] happen to overlap in the same
symbol if the parameter ackNackSRS-SimultaneousTransmission is TRUE. -Unless otherwise
prohibited, the UE shall transmit SRS whenever SRS transmission and PUCCH transmission
carrying HARQ-ACK and/or positive SR using shortened format as defined in subclauses 5.4.1
and 5.4.2A of [3] happen to coincide in the same subframe if the paramter ackNackSRS-
SimultaneousTransmission is TRUE. A UE not configured with multiple TAGs shall not transmit
SRS whenever SRS transmission on any serving cells and PUCCH transmission carrying
HARQ-ACK and/or positive SR using normal PUCCH format as defined in subclauses 5.4.1 and
5.4.2A of [3] happen to coincide in the same subframe. In UpPTS, whenever SRS transmission
instance overlaps with the PRACH region for preamble format 4 or exceeds the range of uplink
system bandwidth configured in the serving cell, the UE shall not transmit SRS. The parameter
ackNackSRS-SimultaneousTransmission provided by higher layers determines if a UE is
configured to support the transmission of HARQ-ACK on PUCCH and SRS in one subframe. If
it is configured to support the transmission of HARQ-ACK on PUCCH and SRS in one
subframe, then in the cell specific SRS subframes of the primary cell UE shall transmit HARQ-
ACK and SR using the shortened PUCCH format as defined in subclauses 5.4.1 and 5.4.2A of
[3], where the HARQ-ACK or the SR symbol corresponding to the SRS location is punctured.
This shortened PUCCH format shall be sued in a cell specific SRS subframe of the primary cell
even if the UE does not transmit SRS in that subframe. The cell specific SRS subframes are
defined in subclause 5.5.3.3 of [3]. Otherwise, the UE shall use the normal PUCCH format
1/1a/1b as defined in subclause 5.4.1 of [3] or normal PUCCH format 3 as defined in subclause
5.4.2A of [3] for the transmission of HARQ-ACK and SR. Trigger type 0 SRS configuration of a
UE in a serving cell for SRS periodicity, $T_{SRS}$, and SRS subframe offset, $T_{offset}$, is defined in
Table 8.2-1 and Table 8.2-2, for FDD and TDD serving cell, respectively. The periodicity $T_{SRS}$
of the SRS transmission is serving cell specific and is selected from the set {2, 5, 10, 20, 40, 80,
160, 320} ms or subframes. For the SRS periodicity $T_{SRS}$ of 2 ms in TDD serving cell, two SRS
resources are configured in a half frame containing UL subframe(s) of the given serving cell.
Type 0 triggered SRS transmission instances in a given serving cell for TDD serving cell with
$T_{SRS} > 2$ and for FDD serving cell are the subframes satisfying $(10 \cdot n_f + k_{SRS} - T_{offset}) \bmod T_{SRS} = 0$, where
for FDD $k_{SRS} = \{0, 1, 0\}$ is the subframe index within the frame, for TDD serving cell kSRS is TABLE 3-continued defined in Table 8.2-3. The SRS transmission instances for TDD serving cell with $T_{SRS} = 2$ are the subframes satisfying $k_{SRS} - T_{offset}$. For TDD serving cell, and a UE configured for type 0 triggered SRS transmission in serving cell c, and the UE configured with the parameter EIMTA-MainConfigServCell-r12 for serving cell c, if the UE does not detect and UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe. Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframe. For the SRS periodicity $T_{SRS,1}$ of 2 ms in TDD serving cell, two SRS resources are configured in a half frame containing UL subframe(s) of the given serving cell. A UE configured for type 1 triggered SRS transmission in a serving cell c and not configured with a carrier indicator field shall transmit SRS on serving cell c upon detection of a positive SRS request in PDCCH/EPDCCH scheduling PUSCH/PDSCH on serving cell c. A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c. A UE configured for type 1 triggered SRS transmission on serving cell c upon detection of a positive SRS request in subframe n of serving cell c shall commence SRS transmission in the first subframe satisfying $n + k$, $k \geq 4$ and $(10 \cdot n_f + k_{SRS} - T_{offset,1}) \bmod T_{SRS,1} = 0$ for TDD serving cell c with $T_{SRS,1} > 2$ and for FDD serving cell c, $(k_{SRS} - T_{offset,1}) \bmod 5 = 0$ for TDD serving cell c with $T_{SRS,1} = 2$ where for FDD serving cell c $k_{SRS} = \{0, 1, \ldots 9\}$ is the subframe index within the frame $n_f$, for TDD serving cell c $k_{SRS}$ is defined in Table 8.2-3. A UE configured for type 1 triggered SRS transmission is not expected to receive type 1 SRS triggering events associated with different values of trigger type 1 SRS transmission parameters, as configured by higher layer signalling, for the same subframe and the same serving cell. For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe. A UE shall not transmit SRS whenever SRS and a PUSCH transmission corresponding to a Random Access Response Grant or a retransmission of the same transport block as part of the contention based random access procedure coincide in the same subframe.

[Table 4] illustrates SRS subframe offsets and UE-specific SRS periodicities $T_{SRS}$ for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

[Table 5] illustrates SRS subframe offsets $T_{offset}$ and UE-specific SRS periodicities $T_{SRS}$ for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

[Table 7] illustrates $k_{SRS}$ for TDD.

TABLE 7

| | subframe index n | | | | | | | | | |
|---|---|---|---|---|---|---|---|---|---|---|
| | 1 | | | | | 6 | | | | |
| 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | 2 | 3 | 4 | 5 | 6 | 7 | 8 | 9 |
| $k_{SRS}$ in case UpPTS length of 1 symbol | 1 | | 2 | 3 | 4 | 6 | | 7 | 8 | 9 |

[Table 8] illustrates SRS subframe offsets $T_{offset,1}$ and UE-specific SRS periodicities $T_{SRS,1}$ for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

[Table 9] illustrates SRS subframe offsets $T_{offset,1}$ and UE-specific SRS periodicities $T_{SRS,1}$ for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

[Table 10] illustrates additional channel change features (blockage effect) of a channel at or above 6 GHz relative to a channel at or below 6 GHz.

TABLE 10

| Ref. | Test description | Tx height | Rx height | Test frequency | Blockage rate relative parameter | |
|---|---|---|---|---|---|---|
| [2] | One blocker moving (1 m/s) Horn (22.4 dBi, 12°) Patch (4.3 dBi/ 2.2 dBi, 58°) 4 blockers moving | 2.2/ 1.2 m | 1.2 m | 60 GHz | Series of Blockage event duration (threshold 5 dB) 780~1839 ms (Horn) 640~1539 ms (Patch) Series of Blockage event duration (threshold 5 dB) 688 ms (Horn, average) 278 ms (Patch, average) | |
| [5] | 1~15 blockers movingThe horns (22.4 dBi, 12° in azimuth, about 10° in elevation) The patches (about 3 dBi, 60° both in elevation and azimuth. The vertical polarization) | 1.58/ 2.77 m | 1.55 m | 60 GHz | Series of Blockage event duration (Threshold 10 dB) 300 ms (1~5 persons) 350 ms (6~10 persons) 450 ms (11~15 persons) | (Threshold 20 dB) 100 ms (1~5 persons) 150 ms (6~10 persons) 300 ms (11~15 persons) |
| [6] | — | — | — | 60 GHz | 93 ms (Mean Drop Rate) | |
| [7] | One blocker moving (Walking speed) 20 dBi, 10° | 1.1 m | 0.75 m | 67 GHz | $t_D$ = 230 ms (average, Threshold 20 dB) | |

TABLE 10-continued

| Ref. | Test description | Tx height | Rx height | Test frequency | Blockage rate relative parameter |
|---|---|---|---|---|---|
| [8] | One blocker moving (Walking speed) 20 dBi, 10° | 1.1 m | 0.75 m | 67 GHz | $t_D$ = 370 ms~820 ms $t_{decay}$ = 230 ms (mean), 92 ms (s.d) (Threshold 20 dB) $t_{rising}$ = 220 ms (mean), 100 ms (s.d) (Threshold 20 dB) |

Figure 2B:
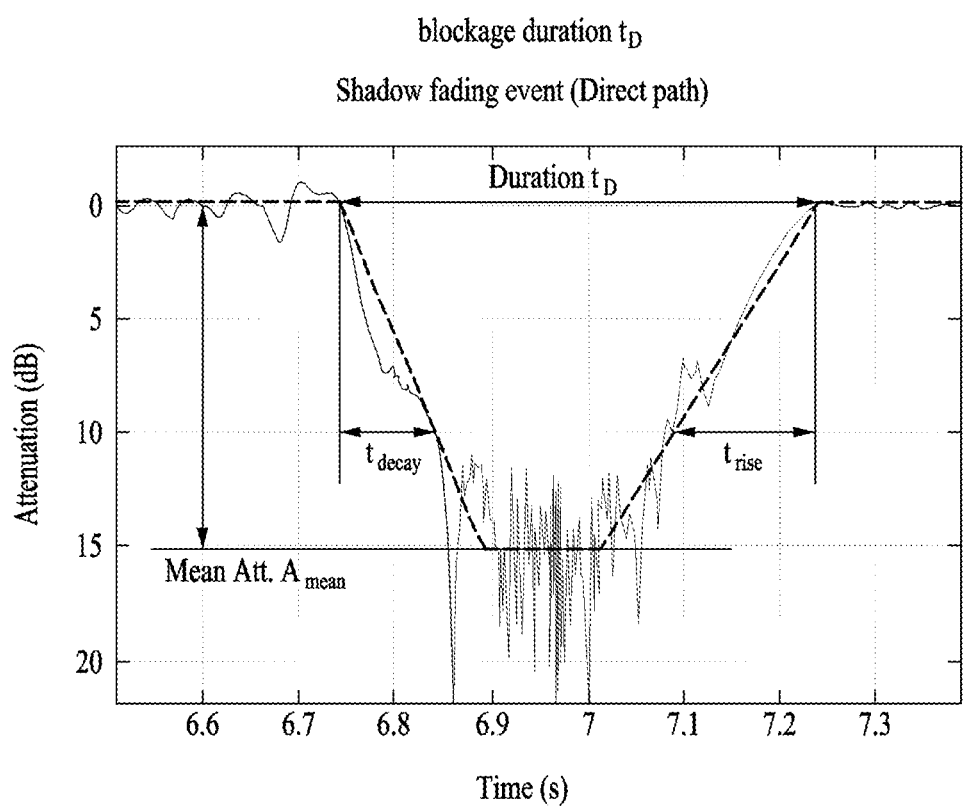
FIG. 2B is a diagram illustrating a blockage duration $t_D$ in [Table 10]

FIG. 2 is a diagram illustrating a blockage duration in relation to [Table 10]. FIG. 2A is a diagram illustrating a series of blockage event duration of [Table 10], which is a time period during which meaningful blockage occurs, and FIG. 2B is a diagram illustrating a blockage duration $t_D$ of [Table 2]. Series of Blockage event represents a time period during which meaningful blockage occurs, and $t_D$ represents a time taken from occurrence of blockage to termination of the blockage and entry into a normal state.

[Table 11] illustrates a pattern relationship between a UE and $t_{decay}$ and $t_{rising}$.

TABLE 11

|  | Walking (0.6 m/s) [7] | Sprinting (10 m/s) [9] | Swift Hand swing (43 m/s) |
|---|---|---|---|
| $t_{decay}$, $t_{rising}$ (ms) | 150 ms (measure) | 9 ms (calculation) | 2.093 ms (calculation) |

In [Table 11], although a blockage change is basically about 100 ms (a walking blocker speed of 4 km/h) on average, the blockage change may vary, ranging from 2 ms to hundreds of ms according to a UE pattern and an ambient environment.

<Analog Beamforming>

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

In this case, the use of a transceiver unit (TXRU) to enable control of transmission power and a phase on an element basis makes it possible to perform independent beamforming on a frequency resource basis. However, installing TXRUs for all of about 100 antenna elements is not effective in terms of cost. Accordingly, a method of mapping a plurality of antenna elements to one TXRU and controlling a beam direction by means of an analog phase shifter is under consideration. A shortcoming with this analog beamforming scheme is that frequency selective beamforming (BF) cannot be provided because only one beam direction can be produced in a total band.

Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 3A:
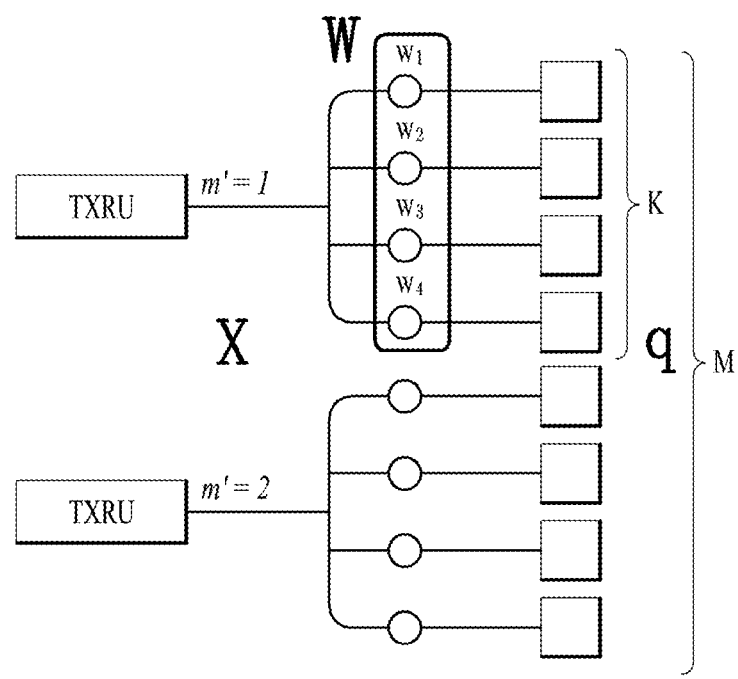
FIG. 3A is a diagram illustrating transceiver unit (TXRU) virtualization model option 1 (sub-array model 1) and FIG. 3B is a diagram illustrating TXRU virtualization model option 2 (full connection mode 1)
Figure 3B:
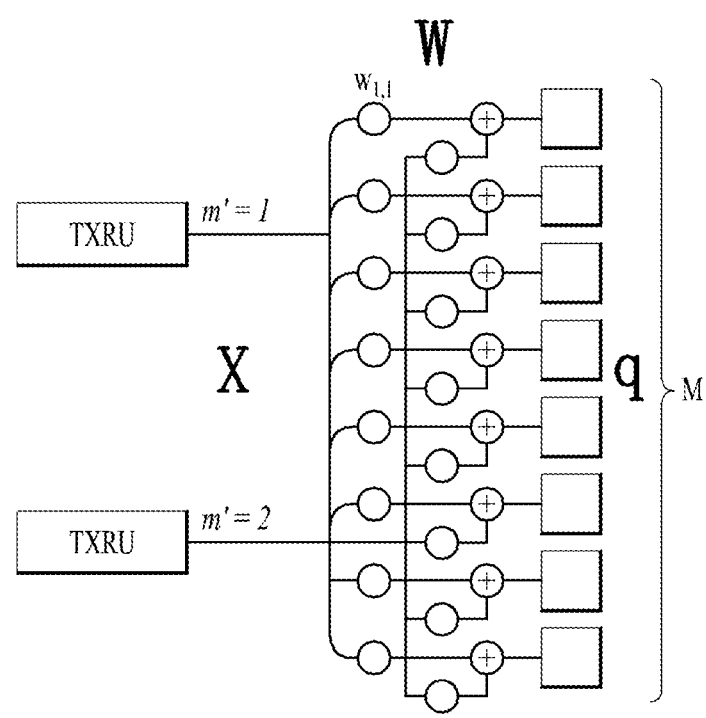

FIG. 3A is a diagram illustrating TXRU virtualization model option 1 (sub-array model 1), and FIG. 3B is a diagram illustrating TXRU virtualization model option 2 (full connection mode 1).

FIGS. 3A and 3B illustrate exemplary representative schemes of mapping between TXRUs and antenna elements. Herein, a TXRU virtualization model defines the relationship between signals output from TXRUs and signals output from antenna elements. FIG. 3A illustrates connection between TXRUs and sub-arrays. In this case, an antenna element is connected to one TXRU only. In contrast, FIG. 3B illustrates connection between TXRUs and all antenna elements. In this case, an antenna element is connected to all TXRUs. In FIG. 3A and FIG. 3B, W represents a phase vector subjected to multiplication in an analog phase shifter. That is, an analog BF direction is determined by W. Herein, CSI-RS antenna ports may be mapped to TXRUs in a one-to-one or one-to-many correspondence.

Hybrid Analog Beamforming

Figure 4:
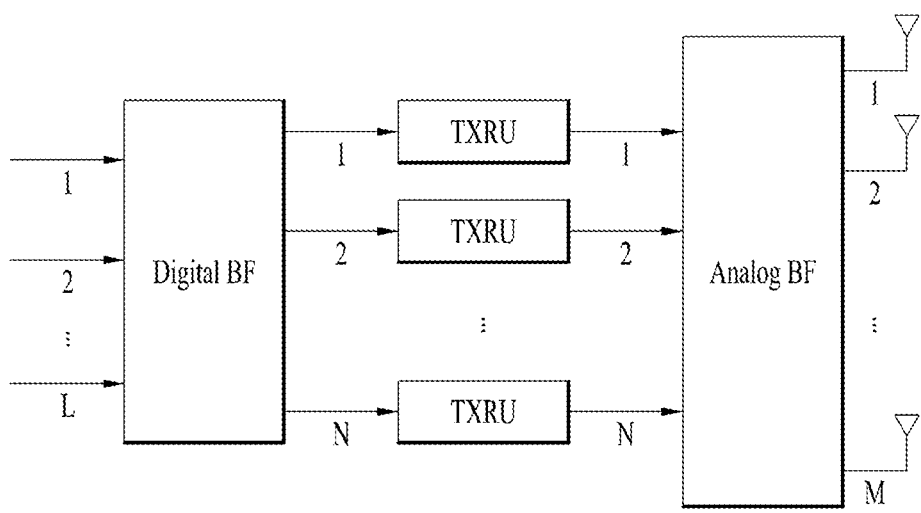
FIG. 4 is a block diagram for hybrid beamforming.

FIG. 4 is a block diagram for hybrid BF.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 4, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered.

As such, in the case where an eNB uses a plurality of analog beams, a different analog beam may be preferred for signal reception at each UE. Therefore, a beam sweeping operation is under consideration, in which for at least an SS, system information, and paging, an eNB changes a plurality of analog beams on a symbol basis in a specific slot or SF to allow all UEs to have reception opportunities.

Figure 5:
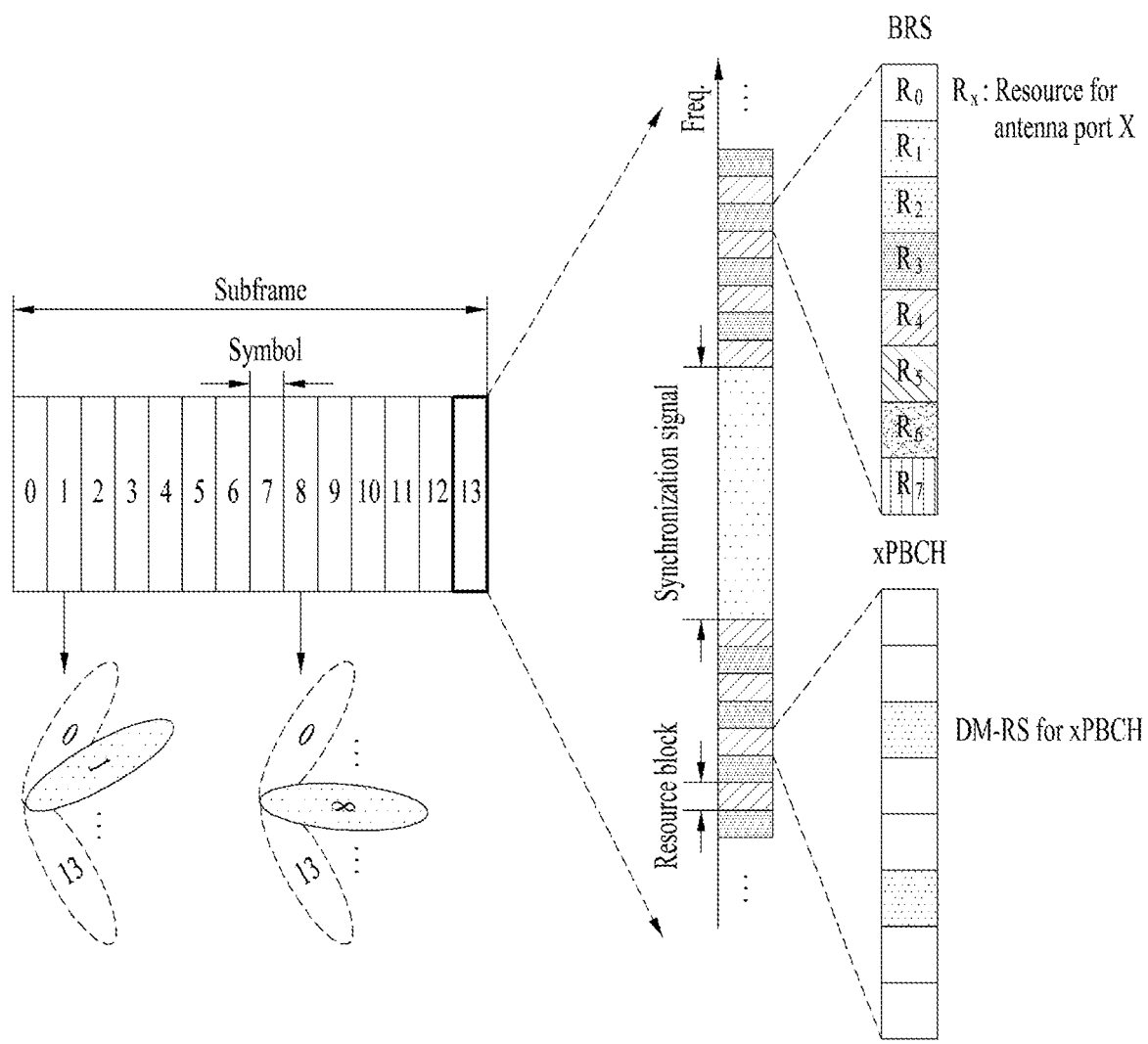
FIG. 5 is a diagram illustrating exemplary mapping between beams and beam reference signal (BRS) symbols in hybrid beamforming.

FIG. 5 is a diagram illustrating exemplary mapping between beams and beam reference signal (BRS) symbols in hybrid BF.

FIG. 5 illustrates beam sweeping for an SS and system information during DL transmission. In FIG. 5, physical resources or a physical channel which broadcasts system information of the New RAT system is referred to as an xPBCH. Analog beams from different antenna panels may be transmitted simultaneously in one symbol, and introduction of a BRS transmitted for a single analog beam corresponding to a specific antenna panel as illustrated in FIG. 5 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 6:
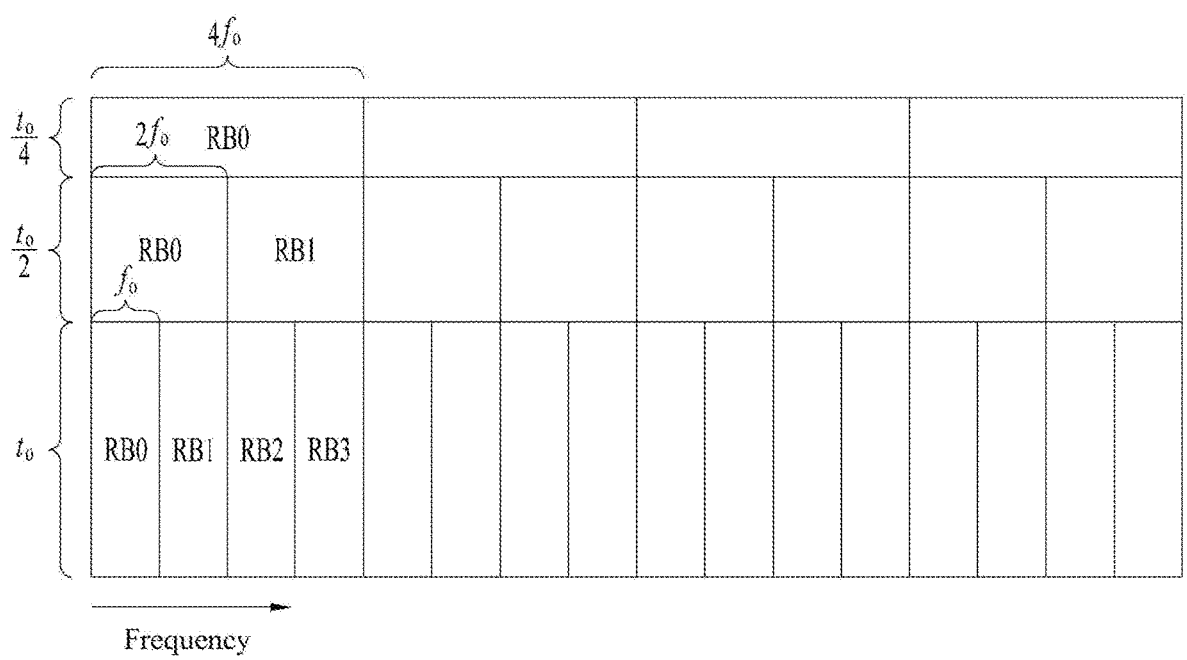
FIG. 6 is an exemplary diagram illustrating symbol/sub-symbol alignment between different numerologies.

FIG. 6 is an exemplary diagram illustrating symbol/sub-symbol alignment between different numerologies.

New RAT (NR) Numerology Features

In NR, a scalable numerology is under consideration. That is, a subcarrier spacing is given as (2n×15) kHz where n is an integer in NR. From the perspective of the nested property, a subset or superset of the above subcarrier spacing (at least 15, 30, 60, 120, 240, and 480 kHz) is considered as primary subcarrier spacings. Accordingly, it has been configured that symbol alignment or sub-symbol alignment across different numerologies is supported by controlling the different numerologies to have the same cyclic prefix (CP) overheard ratio.

Further, a numerology is determined such that the above time/frequency granularity is dynamically allocated according to each service (eMBB, URLLC, or mMTC) and scenario (high speed or the like).

Bandwidth Dependent/Non-Dependent Sequence for Orthogonalization

In the LTE system, an SRS is designed differently according to a sounding bandwidth (BW). That is, a computer-generated sequence is used for design of a sequence of length 24 or less, and a Zadoff-Chu (ZC) sequence is used for design of a sequence of length 36 (3 RBs) or more. Most advantageously, the ZC sequence has a low peak to average power ratio (PAPR) or low cubic metric, and at the same time, ideal auto-correlation and low cross-correlation properties. However, required sequences should be of the same length (sounding BW) to satisfy the above properties. Therefore, in order to support UEs having different sounding BWs, there is a need for a method of allocating UEs to different resource areas, and orthogonality is supported between UEs that perform simultaneous transmissions by allowing IFDMA comb structures to have different sounding BWs, for minimizing the degradation of channel estimation performance. If such a transmission comb (IC) structure is used for a LE having a small sounding BW, the UE may have a sequence length less than a minimum sequence length (generally, length 24) having orthogonality. Therefore, a TC is limited to 2. If the same TC is used in the same sounding resource, a dimension that provides orthogonality is required, thereby leading to use of CDM using a cyclic shift (CS).

There are sequences available for resource mapping irrespective of sounding BWs, although they are more or less inferior to ZC sequences in terms of and correlation performance. The sequences include, for example, a Golay sequence and a pseudo random (PN) sequence. For a Golay sequence, let the auto-correlation values of sequences a and h be denoted by $A_a$ and $A_b$, respectively. Then, a and b which satisfy the following condition is referred to as a Golay complementary sequence pair ($A_a+A_b=\delta(x)$).

Figure 7:
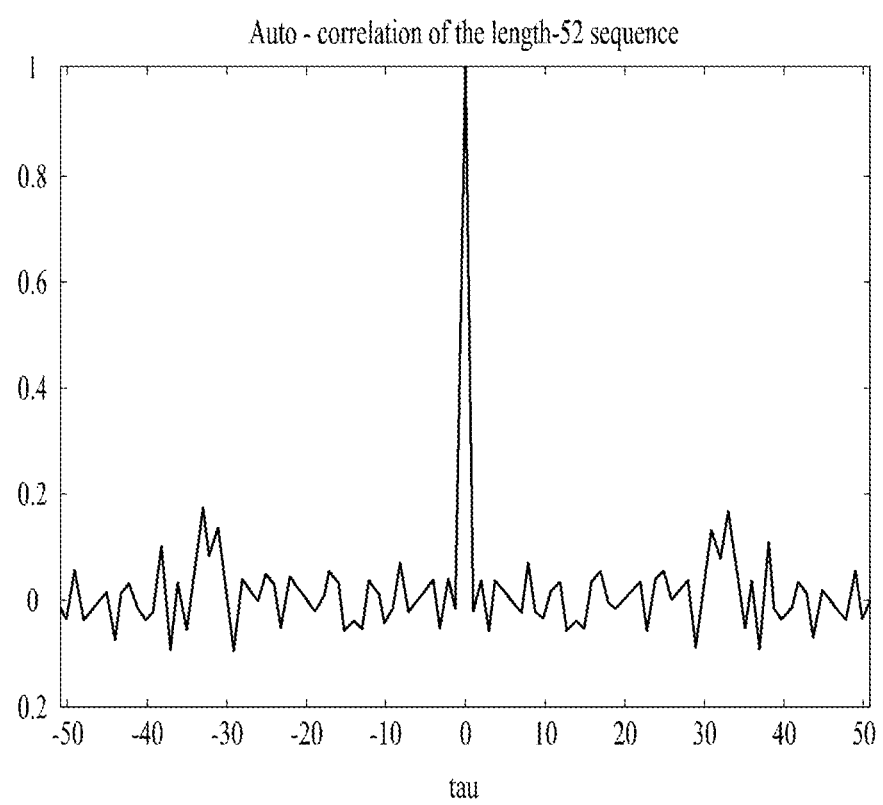
FIG. 7 is a diagram illustrating the performance of auto-correlation of a length-52 sequence, using two length-26 Golay complementary sequence pairs.

For example, when length-26 Golay sequences a and h are given as a=[1 −1 1 1 −1 −1 1 −1 −1 −1 −1 1 −1 1 −1 −1 −1 −1 1 1 1 −1 −1 1 −1 1] and b=[−1 1 1 −1 −1 1 1 1 −1 1 1 1 1 −1 −1 −1 −1 −1 −1 1 1 −1 −1 −1 1 −1 1], the two sequences are concatenated to a length-52 sequence. When zeros are mapped to four resource elements (IRE) at both sides, the resulting auto-correlation performance is as illustrated in FIG. 7. FIG. 7 is a diagram illustrating the performance of auto-correlation of a length-52 sequence using two length-26 Golay complementary sequence pairs.

Figure 8:
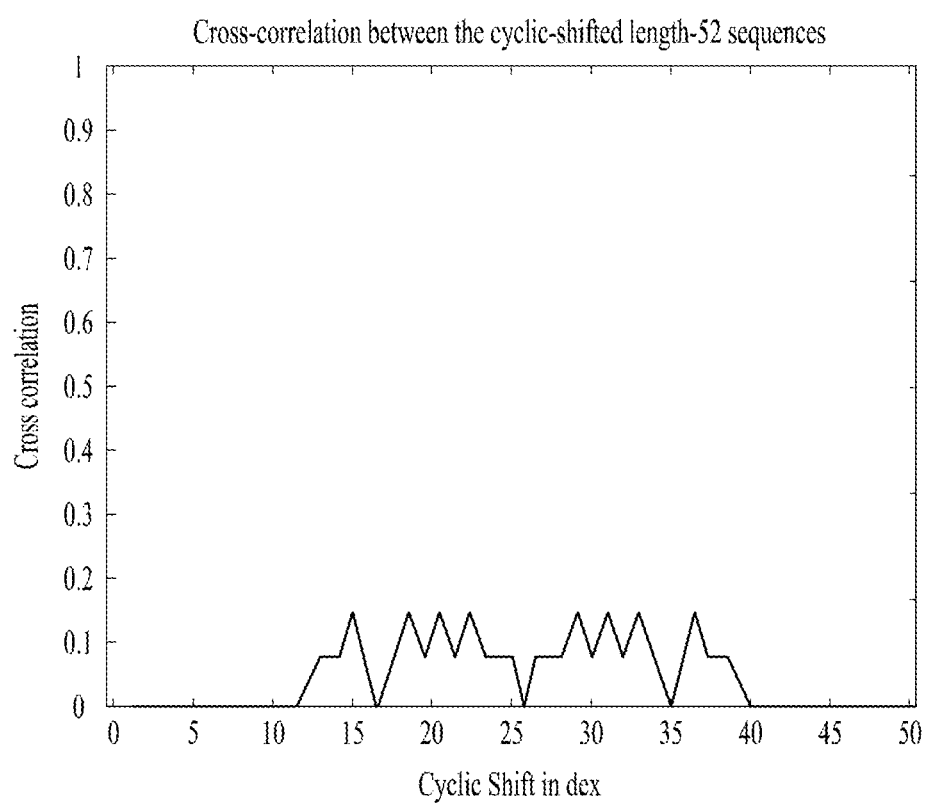
FIG. 8 is a diagram illustrating cross-correlation between length-52 Golay sequences having different cyclic shifts (CSs)

FIG. 8 is a diagram illustrating cross-correlation between sequences having different CSs in a length-52 Golay sequence.

A plurality of CSs may be applied to the length-52 sequence to generate a plurality of Golay sequences. Cross-correlation between Golay sequences having different CSs is illustrated in FIG. 8.

FIG. 9 is a diagram illustrating cross-correlation and cubic-metric evaluations of ZC, Golay and PN sequences.

The cubic metrics (CMs) and cross-correlations of the ZC, Golay and PN sequences are calculated and compared with one another, for TCs of 1, 2 and 4. For the evaluation, the following is assumed.

Sounding BWs are set to 4, 8, 12, 16, 20, 24, 32, 36 and 48 RBs (based on an LTE SRS design).

As in the LTE system, 30 groups number $u=(f_{gh}(n_s)+f_{ss})$ mod 30 is determined as follows, where $(f_{gh}(n)_s), f_{ss})$ is determined based on a cell identifier (ID), For 4 RBs, one base sequence v is selected, and for the remaining lengths, two base sequence numbers v are selected.

For the Golay sequence, a truncated binary Golay sequence of length 2048 in an 802.16m system was used and a QPSK PN sequence was taken as an example for an independent BW SRS design. In order to represent 30 groups by the ZC sequence, the Golay sequence was generated using 30 CSs, and 30 PN sequences were generated in Matlab.

The evaluation was performed using TC=1, 2 and 4.

in the cubic metric evaluation, an oversampling factor (OSF) was set to 8 for a better resolution.

Referring to FIG. 9(a), cross correlation performance was in the order of ZC sequence>Golay sequence>PN sequence, and CM performance was in the order of ZC sequence>Golay sequence>PN sequence. From the perspective of SRS sequence generation for UL transmission, the ZC sequence exhibits good performance as in the LIE system. Nonetheless, in order to increase the freedom of allocating a sounding BW to each UE the Golay sequence or the PN sequence may not be excluded from SRS sequence candidates in New RAT.

UEs may implicitly indicate hardware antenna/panel structures as their capabilities (e.g., beamforming capabilities). Further, each UE may select an optional port subset from an eNB-configured port set and transmit the selected port subset under circumstances (a UE in a UE Tx power-limited environment may transmit an SRS with higher Tx power through an optional port subset to the eNB). Therefore, there is a need for a configuration that enables adaptive transmission of SRS resources corresponding to a selected port subset or a subset of specific beams. Further, a Tx beam of each UE mapped to one port needs to be transmitted in one or more UL transmission instances (one UL transmission instance may be defined as one symbol or slot) according to a UL beam management policy (e.g., UE Tx beam sweeping, TRP Rx beam sweeping, or both UE Tx beam sweeping and TRP Rx beam sweeping). Particularly for a cell-edge UE, a channel estimation BW region based on a UE Tx beam-TRP Rx beam pair may be limited in view of transmission power during SRS transmission for UL channel estimation, and when full BW transmission is required, an SRS may be transmitted by the same pair of beams in multiple partial band SRS transmission instances. According to these various SRS transmission configurations in the NR system, mapping between SRS resources and ports needs to be considered.

In New RAT, an SRS may be transmitted in one or more SC-FDMA/OFDM symbols, and the SRS transmission may be performed in one or more (e.g., K>1) SRS resources. The eNB may transmit a sounding RS indicator (SRI) (or SRS resource indicator or referred to as any of various other terms) to the UE by downlink control information (DCI) (format), a medium access control-control element (MAC-CE), or higher-layer signaling. The SRI may indicate each SRS resource configured for the UE, particularly the number of SRS resources for the UE. Further, the SRI may indicate one or more beams or ports for SRS transmission, and indicate the same or different Tx beams of the UE according to an SRS resource configuration. Further, considering that the constraint of a low PAPR or CM value on UL, unlike DL, it is better to avoid FDM between an SRS and another channel in designing SRS transmission, if possible. However, this does not imply that transmission of a single SRS symbol and another UL channel in FDM cannot be performed for the purpose of UL beam management or channel estimation. The same SRS BW freedom as in the LTE system should be given to each UE, and from this viewpoint, such an IFDMA structure (i.e., a structure related to a TC value) as used as in the LTE system needs to be maintained in order to increase UL channel estimation performance. Under this condition, transmission of 1, 2, 4, or 8 ports as SRS ports supported in NR should be ensured in an SRS transmission instance.

Figure 10:
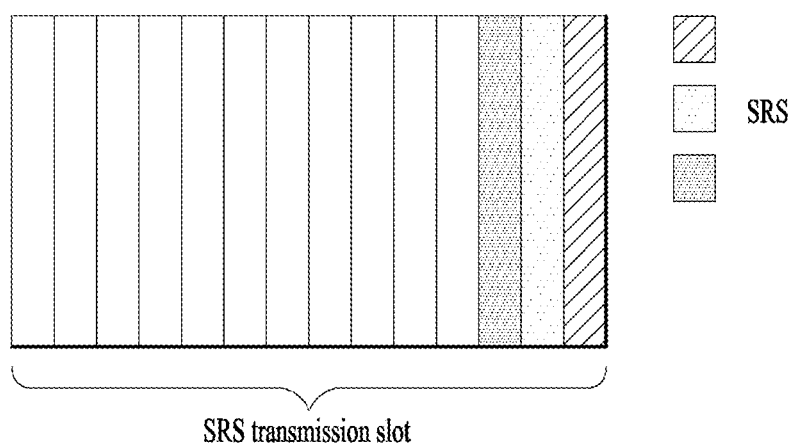
FIG. 10 is a diagram illustrating exemplary positions of one or more single carrier-frequency division multiple access (SC-FDMA)/orthogonal frequency division multiplexing (OFDM) symbols for sounding reference signal (SRS) transmission, when an SRS transmission slot includes 14 symbols.

FIG. 10 is a diagram illustrating exemplary positions of one or more SC-FDMA/OFDM symbols for SRS transmission, when an SRS transmission slot includes 14 symbols.

FIG. 10 illustrates a case in which an SRS is transmitted in three consecutive SC-FDMA/OFDM symbols with symbol indexes 11, 12 and 13. Although a slot is illustrated as lasting for 14 symbols in FIG. 14, the symbol duration may be 7 SC-FDMA/OFDM symbols. Upon triggering of an SRS transmission, the eNB may transmit a configuration indicating the number of SRS symbols in an SRS transmission instance (e.g., an SRS transmission slot) to the UE by DCI, RRC signaling, a MAC-CE, or the like.

SRS resources may be configured in an SRS transmission BW. A total of K (=N×J) SRS transmission resources may be configured in a total of N SRS transmission symbols. Further, when the SRS BW includes multiple localized SRS units in a concatenated SRS structure, a total of N symbols are configured as SRS symbols, and U SRS resources are configured in a localized SRS unit, K (=N×L×U where L×U=J) SRS resources may be configured.

1, 2, 4, 8 or any other number of ports may be mapped to one SRS resource according to an SRS configuration. To ensure orthogonality between the ports, the ports may be mapped in FDM in one SRS resource or in CDM in the same resource position. In the case of CDM, ZC sequences may use TCs/CSs, and PN sequences may use TCs/OCCs. In NR, the TC value may be 2 or 4, which may be signaled cell-specifically or UE-specifically to the UE by higher-layer signaling (e.g., RRC signaling), a MAC-CE, or DCI from the eNB. A TC may be defined as the number of resource elements (REs) between the same SRS resources within a sounding BW, if a sequence mapped to each SRS resource is designed independently. Accordingly, each SRS resource may be mapped using a different TC offset. This structure offers the benefit of minimizing the degradation of UL channel estimation performance, when SRS resources of different lengths (i.e., a sequence mapped to each resource has a different length) are multiplexed within a given SRS BW. Further, freedom is given for each SRS resource length, and for a criterion for SRS resource mapping, each of various SRSs configured according to the number M of SRS resources that may be allocated in the frequency domain within an SRS BW of a UE, determined according to the UE beamforming capability (e.g., the number of TXRUs, the number of panels, an antenna array configuration, and so on at the UE) and the number of ports mapped to each SRS resource may be represented simply by a TC and a TC offset. Notably, it is assumed that different beams are used for different resources in frequency.

For example, if the number M of SRS resources for simultaneous transmission at the UE is given as 2 (M=2) and the number of ports available for mapping per SRS resource is 8 according to the UE beamforming capability of the UE, the eNB calculates a TC value in consideration of the number 8 of ports available for mapping per SRS resource and sets TC=2. For simultaneous transmission on two different beams, the TC offset is set to 0 for one SRS resource and 1 for the other SRS resource. Then, the TC value and the TC offsets may be indicated to the UE.

Now, a description will be given of examples related to SRS resource configurations and mapping patterns.

FIG. 11 is a diagram illustrating exemplary SRS resource configurations and port mapping in frequency.

In the illustrated case of FIG. 11(a), a TC of 8 is maintained for each SRS resource. This structure allows FDM with a UE having the same/different TC (e.g., TC=2, 4, 8, or the like) within the SRS BW. The length of a sequence mapped to each SRS resource may be equally set to 24 (for a BW of 16 RBs). The number of REs per resource block (RB), for each SRS resource has a density of 1.5 (i.e., 1.5 REs/RB).

In the illustrated case of FIG. 11(b), although a TC of 8 is maintained for each SRS resource, the TC of another UE should also be 8 and different TC offset values should be configured for different SRS resources, for multiplexing with another UE. The length of a sequence mapped to each SRS resource is equally 24 (for a BW of 16 RBs). The number of REs per RB for each SRS resource has a density of 1.5 (i.e., 1.5 REs/RB).

In the illustrated case of FIG. 11(c), SRS resources have different lengths (e.g., SRS resource #0=length 48 and SRS resource #4=length 24). The TC is 8 equally for the SRS resources. For SRS resources of length 48, the number of SRS resource REs per RB has a density of 1.5, whereas for SRS resources of length 24, the number of SRS resource REs per RB has a density of 0.75. These SRS resources are localized with respect to 16 RBs. The starting point of sequence mapping of SRS resource #4 may be the starting point of 16 RBs.

In the illustrated case of FIG. 11(d), since TC=4, better UL channel estimation performance is achieved, compared to the cases of FIGS. 11(a), 11(b), and 11(c). Further, compared to the cases of FIGS. 11(a), 11(b), and 11(c) in which RPF values are low, more SRS ports (herein, 8 ports) may be allocated by CSs. However, an SRS of a second UE may not be transmitted along with an SRS of a first UE in FDM within the SRS BW of the first UE. If any second UE intends to perform UL channel estimation at the position of the SRS BW allocated to the first UE, an SRS transmission from the second UE may be possible in the next SRS transmission instance.

Figure 12:
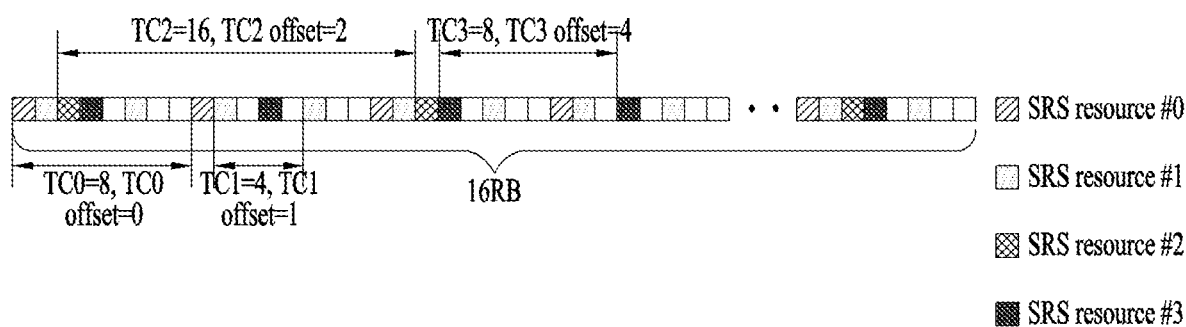
FIG. 12 is a diagram illustrating exemplary SRS resource-specific transmission comb (TC) configuration and SRS resource deployment.

FIG. 12 is a diagram illustrating SRS resource-specific TC value settings and SRS resource deployment.

A TC value may be set SRS resource-specifically. As illustrated in FIG. 12, when four SRS resources are configured, different TC values and TC offset values may be set for the respective SRS resources in a manner that avoids overlapping between intra-SRS resources and between different UEs.

In another embodiment, OCCs are applied. When a PN sequence or a Golay sequence is used, resources from the same resources are grouped, and the group is multiplied by an OCC value $[\overline{w}^{(\tilde{p})}(0) \ldots \overline{w}^{(\tilde{p})}(N_{RE}^{SRS}-1)]$ given in [Table 12], and transmitted. An OCC value is multiplied by one contiguous SRS resource. Herein, $N_{RE}^{SRS}$ represents the number of ports mapped to one SRS resource. [Table 12] lists exemplary OCCs for $N_{RE}^{SRS}=4$.

TABLE 12

| $\tilde{p}$ | Sequence $[\overline{w}^{(\tilde{p})}(0) \ldots \overline{w}^{(\tilde{p})} N_{RE}^{SRS} - 1)]$ $N_{RE}^{SRS} = 4$ |
|---|---|
| p0 | [+1 +1 +1 +1] |
| p1 | [+1 −1 +1 −1] |
| p2 | [+1 +1 −1 −1] |
| P3 | [+1 −1 −1 +1] |

Figure 13:
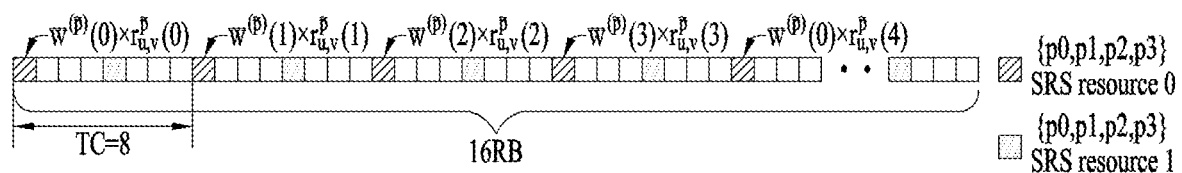
FIG. 13 is a diagram illustrating exemplary application of an orthogonal cover code (OCC)

FIG. 13 is a diagram illustrating exemplary application of an OCC for $N_{RE}^{SRS}=4$.

In FIG. 13, the number of ports per SRS resource is 4, and the number of SRS resources per symbol is 4, by way of example. As illustrated in FIG. 13, four REs of SRS resource #0 and four REs of SRS resource #1 are grouped respectively, and OCCs may be applied to the groups according to corresponding ports $\overline{P}$.

Methods of performing an SRS configuration including an SRS resource configuration will be described below.

Proposal 1

When the eNB configures the UE with a plurality of SRS resources, the eNB supports the following alternatives for multiplexing between the SRS resources. For the UE, the eNB may determine an SRS resource multiplexing scheme according to the UE beamforming capability, power capability (e.g., a power boosting range), and/or wireless environment (e.g., cell-centered UE/cell-edge UE) of the UE. In this case, the eNB may determine the SRS resource multiplexing scheme according to information about a UE beamforming capability, a power capability (e.g., a power boosting range), and/or a wireless environment (e.g., cell-centered UE/cell-edge UE) transmitted by the UE. The eNB may transmit information about the determined SRS resource multiplexing scheme in SRS resource configuration information to the UE.

Alt 1: The SRS resources may be multiplexed in TDM in different symbols within a slot (or an SRS transmission slot), for transmission.

Alt 2: The SRS resources may be multiplexed in TDM or FDM in different symbols and/or subcarrier sets within a slot (or an SRS transmission slot), for transmission.

Alt 3: The SRS resources may be multiplexed in FDM in different subcarrier sets of the same symbol within a slot (or an SRS transmission slot), for transmission.

FIG. 14 is a diagram illustrating exemplary SRS resource index settings (K>=1).

FIG. 14(a) illustrates an exemplary SRS resource configuration in Alt 1, FIG. 14(b) illustrates an exemplary SRS resource configuration (L=2, J=2/K) in Alt 2, and FIG. 14(c) illustrates an exemplary SRS resource configuration in Alt 3.

Proposal 2

The UE may transmit UE capability information (e.g., UE beamforming capability information) to the eNB. The UE capability information may include information about the numbers of SRS ports and SRS resources available for simultaneous transmission at the UE, the number of TXRUs at the UE, the number of panels at the UE, and so on. The eNB may perform an SRS resource configuration for the UE according to the UE capability information and transmit SRS resource configuration information to the UE. Each SRS resource configuration may specify the number N and/or positions of symbols for SRS transmission in one slot, an index P indicating the number of SRS symbols mapped to the same UL Tx beam or indication information indicating whether the same or different UL Tx beams are applied in one slot, the number M of SRS resources in one SRS symbol, and the number Q of mapped ports per SRS resource. A constraint may be imposed on combinations of N, M, P, and/or Q according to UE capability information (or UE beamforming capability information).

Transmission of the same SRS beam in a plurality of SRS symbols at the UE may enable the eNB to use a UL Rx beam for tracking. If the UE transmits different SRS beams in a plurality of SRS symbols, the eNB may select a UL Tx beam of the UE from among the different SRS beams transmitted in the plurality of SRS symbols.

TABLE 13

| UE Beamforming Capability index | Maximum number of Tx antenna ports | SRS Resource Multiplexing Scheme 1: TDM only(analog beamforming or hybrid beamforming with same beam constraint) SRS Resource Multiplexing Scheme 2: FDM or FDM/TDM (digital beamforming or hybrid beamforming having multi-beam capability) |
|---|---|---|
| 0 | 1 | SRS Resource Multiplexing Scheme 1 |
| 1 | 2 | SRS Resource Multiplexing Scheme 1 |
| 2 | 2 | SRS Resource Multiplexing Schemes 1 and 2 |
| 3 | 4 | SRS Resource Multiplexing Scheme 1 |
| 4 | 4 | SRS Resource Multiplexing Schemes 1 and 2 |
| 5 | 8 | SRS Resource Multiplexing Scheme 1 |
| 6 | 8 | SRS Resource Multiplexing Schemes 1 and 2 |
| reserved | — | — |

Referring to [Table 13], a UE beamforming capability index may be included in UE beamforming capability information. The UE beamforming capability index may indicate the maximum number of Tx antenna ports at the UE (e.g., the maximum number of Tx antenna ports for SRS transmission at the UE) and an SRS resource multiplexing scheme. For example, if the UE beamforming capability index is '2', it may indicate that the maximum number of Tx antenna ports is 2 and both of SRS resource multiplexing schemes 1 and 2 are supported.

Proposal 2-1

If the maximum number of Tx antenna ports is 1 in the beamforming capability of the UE, the eNB may support TDM only between SRS resources (Alt 1 in proposal 1) and provide or transmit TDM configuration information (the number N of SRS symbols, an index P indicating the number of SRS symbols mapped to the same UL Tx beam, the number M of SRS resources per SRS symbol, the number Q of mapped ports per SRS resource, and so on) to the UE. When the eNB provides the TDM configuration information, the eNB may transmit an index indicating a TDM configuration or the number M of SRS resources per SRS symbol set to 1 (M=1).

Figure 15:
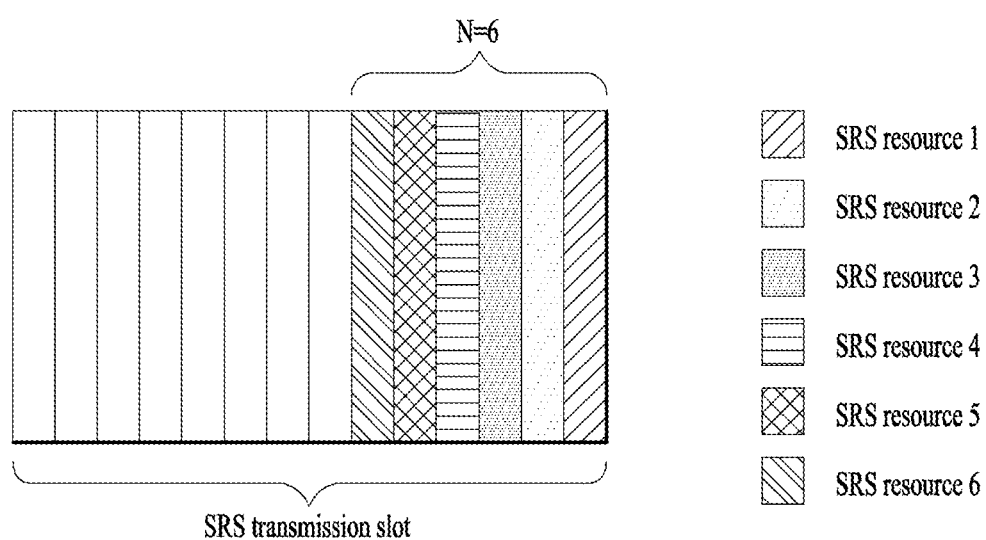
FIG. 15 is a diagram illustrating an exemplary SRS configuration (K=6) for UE beamforming capability index 0 in [Table 13]

FIG. 15 is a diagram illustrating an exemplary SRS configuration (K=6) when the UE beamforming capability index is 0 in [Table 13].

If the maximum number of antenna ports is 1 (reported as index '0' in [Table 13]) in the UE beamforming capability information, the eNB determines that the UE has one TXRU and thus only one SRS resource per symbol is available. When the eNB determines that the total number of SRS resources is 6, that is, K=6, the eNB may transmit information indicating the above TDM only configuration (Alt 1 in proposal 1), and information indicating N=6, P=6, M=1, and Q=1 to the UE, upon SRS triggering. In the SRS configuration, therefore, 6 SRS resources are transmitted in TDM, and each SRS resource indicates the same Tx beam as illustrated in FIG. 15. In FIG. 15, N is the number of SRS symbols, P is an index indicating the number of SRS symbols mapped to the same UL Tx beam, M is the number of SRS resources per SRS symbol, and Q is the number of mapped ports per SRS resource.

Proposal 2-2

If the UE beamforming capability information indicates that the maximum number of Tx ports is 2 at the UE and the UE supports TDM/FDM between SRS resources, the eNB may select TDM only, FDM only, or TDM/FDM between SRS resources according to the maximum number of Tx ports because the eNB supports both TDM and FDM between SRS resources.

Figure 16:
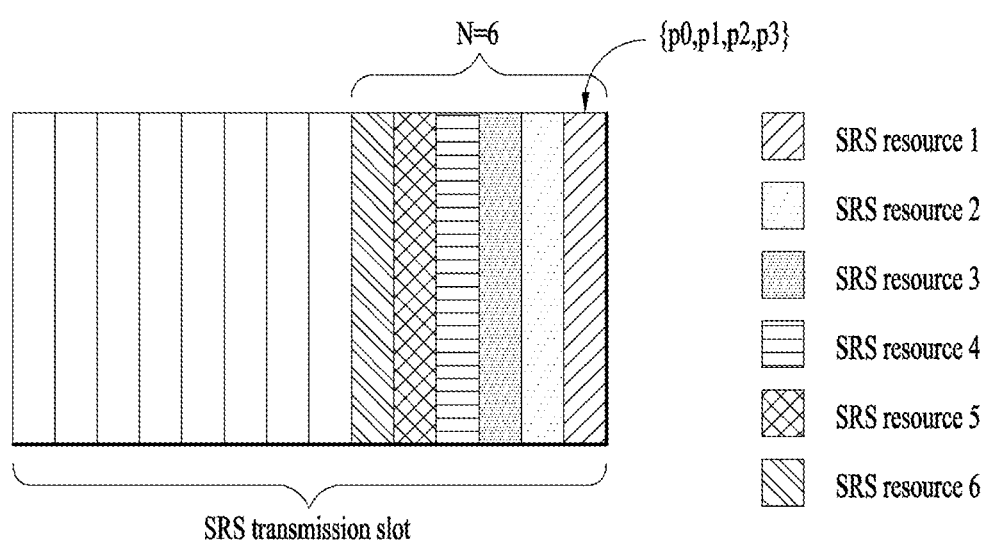
FIG. 16 is a diagram illustrating an exemplary case in which the maximum number of transmission (Tx) beam ports at a UE is 4 and time division multiplexing (TDM) only is set as an SRS resource multiplexing scheme.

FIG. 16 illustrates an exemplary case in which the maximum number of Tx ports at a UE is 4 and the SRS resource multiplexing scheme is TDM only.

In an embodiment, if the maximum number of Tx ports is 4 and TDM/FDM is supported in the UE beamforming capability (UE beamforming capability index=4 in [Table 13]), the eNB sets the number of SRS resources to 1 and the number of ports mapped to the SRS resource to 4, when selecting TDM only between SRS resources. If the number of SRS resources is 6, that is, K=6, an SRS may be transmitted in the manner illustrated in FIG. 15. Herein, the eNB may determine that N=6, P=1, M=1, and Q=4 and transmit this information to the UE.

In this case, one SRS symbol includes one SRS resource, four SRS ports are mapped to the SRS resource, and each symbol indicates a different Tx beam.

FIG. 17 illustrates an exemplary case in which the maximum number of Tx ports at a UE is 4 and FDM only is applied between SRS resources.

The number of SRS resources is set to 4 in the illustrated case of FIG. 17(a) and 2 in the illustrated case of FIG. 17(b).

If the eNB selects FDM only between SRS resources or a combination of FDM and TDM between SRS resources as an SRS resource multiplexing scheme, the eNB may determine the number of SRS resources available for multiplexing in one symbol based on the beamforming capability of the UE, that is, a TXRU-to-antenna mapping scheme and whether independent beamforming is possible in each antenna sub-array. For example, it is assumed that TXRU-to-antenna mapping is performed in a sub-array partitioning structure, that is, a whole antenna array is divided into sub-arrays and each sub-array is mapped to one TXRU. If there are four TXRUs and independent beamforming is possible on a sub-array basis, up to four SRS beams may be multiplexed in FDM in one symbol. In this case, as illustrated in FIG. 17(a), each beam is generated by one TXRU and thus the number of ports per SRS beam may be 1 (that is, N=1, P=1, M=4, Q=1).

Beamforming may be applied for each pair of sub-arrays. In this case, the number of SRS resources multiplexed in FDM in one symbol may be set to 2, as illustrated in FIG. 17(b). Then, since the number of TXRUs per beam is 2, two SRS ports may be transmitted in each SRS resource on the assumption of non-precoded SRS port transmission (e.g., N=1, P=1, M=2, and Q=2 where Q is the number of SRS ports per SRS resource per symbol and M is the number of multiplexed SRS resources per SRS symbol).

FIG. 18 illustrates an exemplary case in which the maximum number of Tx ports at a UE is 4 and TDM and FDM in combination are applied between SRS resources.

The number of SRS resources per symbol is set to 4 in the illustrated case of FIG. 18(a) and 2 in the illustrated case of FIG. 17(b).

In the case where the eNB selects a combination of TDM and FDM between SRS resources, if the number of SRS resources is 8 (K=8) and the number of SRS resources allocated to one symbol is 4, N=2, P=1, M=4, and Q=1, as illustrated in FIG. 18(a). In the case where the eNB selects a combination of TDM and FDM between SRS resources, if the number of SRS resources is 8 (K=8) and the number of SRS resources allocated to one symbol is 2, N=4, P=1, M=2, and O=2, as illustrated in FIG. 18(b).

Proposal 2-3

The eNB may configure an SRS transmission configuration capability (e.g., N, P, M, and Q values) to be lower than indicated by the UE capability information of the UE.

Figure 19:
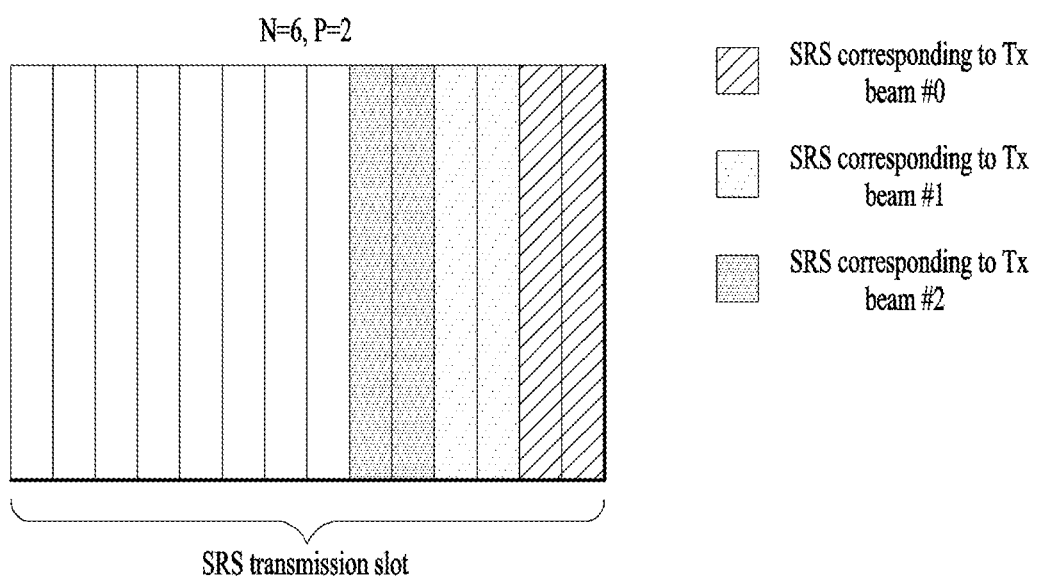
FIG. 19 is a diagram illustrating exemplary SRS time/frequency mapping (N=6, P=2, M=1, O=1)

FIG. 19 is a diagram illustrating exemplary SRS time/frequency mapping (N=6, P=2, M=1, O=1).

An example in which an SRS transmission configuration (N, P, M, and O) determined by the eNB is lower than indicated by UE capability information. It is assumed that the UE beamforming capability is defined as illustrated in [Table 13]. Although the UE transmits UE beamforming capability index 4 (i.e., a maximum number of Tx ports of 4 and TDM/FDM available between SRS resources) to the eNB, the eNB may configure N, P, M, and Q suitable for a lower UE beamforming capability according to an eNB SRS transmission policy. For example, as illustrated in FIG. 18, to indicate an SRS transmission configuration for UL beam management for 3 Rx TRP beams, the eNB may set the number N of SRS transmission symbols to 6 (N=6), the number P of SRS symbols mapped to the same Tx beam to 2 (P=2), the number M of SRS resources per symbol to 1 (M=1), and the number Q of ports per SRS resource to 1 (Q=1). Therefore, the UE may adaptively transmit one port in one symbol and represent a total of 3×1 beams in an SRS instance. A TRP Rx beam is swept every two SRS consecutive SRS symbols.

Proposal 2-4

If an SRS transmission configuration capability (e.g., N, P, M, and Q values) determined by the eNB is higher than the UE beamforming capability, the UE declares the SRS transmission configuration capability as wrong, and transmits a message indicating the wrong SRS configuration to the eNB on a physical uplink control channel (PUCCH) or a physical uplink shared channel (PUSCH). The message may include an indicator (e.g., a flag) indicating the wrong SRS configuration. Optionally, the message may include maximum allowed values N1, P1, M1, and Q1 of the UE and/or a subset of N1, P1, M1, and Q1. Upon receipt of the message, the eNB may reconfigure an SRS such that N≤N1, P≤P1, M<=M1, and O<=O1.

Proposal 2-5

If the SRS transmission configuration capability (e.g., N, P, M, and Q values) determined (or configured) by the eNB is higher than the UE beamforming capability, the UE may transmit an SRS in consideration of the UE capability based on the UE capability information, and a message indicating that the SRS transmission configuration has been changed as requested by the UE to the eNB. This message may include an indicator (e.g., a flag) indicating that the SRS transmission configuration has been changed due to the UE's request.

Optionally, the message may include changed values N2, P2, M2, and Q2 (equal to or less than the maximum available values N1, P1, M1, and Q1 of the UE) and/or a subset of N2, P2, M2, and Q2. The UE may transmit an SRS based on the values corresponding to the subset.

Figure 20:
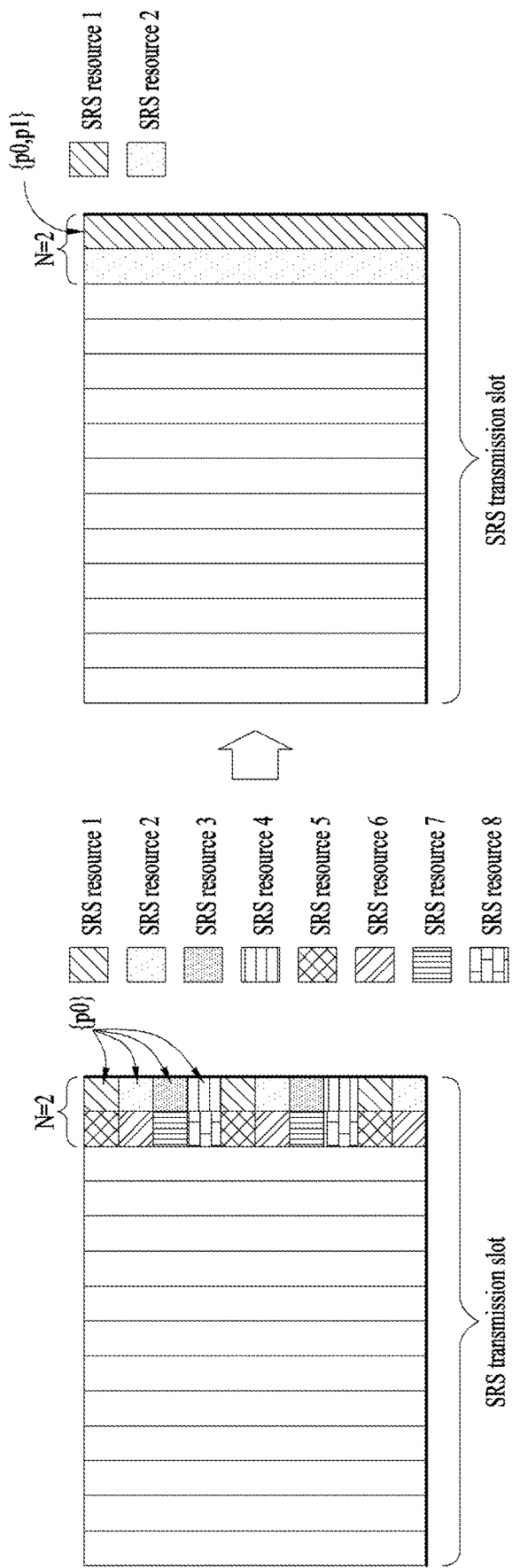
FIG. 20 is a diagram illustrating an exemplary SRS transmission which has been changed due to a UE beamforming capability (N=2, P=1, M=4, Q=1→N2=2, P2=1, M2=1, Q2=2)

FIG. 20 is a diagram illustrating an exemplary SRS transmission changed due to a UE beamforming capability (N=2, P=1, M=4, Q=1→N2=2, P2=1, M2=1, Q2=2).

Referring to FIG. 20, the UE may report its UE capability information as UE capability information index 1 of [Table 13] to the eNB. Herein, the eNB mistakes UE capability information index 1 for UE capability information index 4 and configures an SRS with N=2, P=1, M=4, and Q=1, as illustrated in FIG. 19. However, since the number of available Tx ports is 2 and TDM only is available for multiplexing between SRS resources, for UE capability information index 1, the UE configures and transmits an SRS with M2=1 and Q2=2, and transmits changed SRS configuration information, M2=1 and Q2=2 in an SRS transmission message on a PUSCH or PUCCH to the eNB. The eNB acquires a message related to the SRS transmission message before detecting the SRS, and then detects the SRS based on the changed SRS configuration.

Proposal 3

The UE may request a desired method or configuration among SRS transmission configurations to the eNB. Request message information indicating the request may include information about a desired SRS resource multiplexing scheme (e.g., TDM only, FDM only, or TDM and FDM in combination, for application between SRS resources) and/or, when desired SRS resources are multiplexed, the number N of SRS symbols, the number P of symbols mapped to the same beam, the number M of SRS resources per symbol, and the number Q of SRS ports per SRS resource. At least one of N, P, M, and Q may be included in the request message.

In an embodiment, although FDM between SRS resources is available for a UE limited in Tx power boosting (a PA limitation UE) in the UE's beamforming capability, the UE may transmit a message requesting TDM only between SRS resources to the eNB. Therefore, the eNB may configure only one SRS resource in one SRS symbol and indicate M=1 to the UE. The UE may configure one SRS resource per symbol and transmit an SRS in one SRS resource per symbol.

Proposal 4

For SRS transmission serving the purpose of UL channel estimation, an SRS frequency hopping pattern as well as the number N of SRS symbols, the number P of symbols mapped to the same beam, the number M of SRS resources per symbol, and the number Q of SRS ports per SRS resource may be configured according to the UE's environment.

If a cell-edge UE needs channel estimation across a total UL BW, for best UE Tx beam/TRP Rx beam pairs, the eNB may determine a P value corresponding to the total UL BW/a maximum available SRS BW at the current time and provide a frequency hopping pattern for each symbol to the UE so that the UE performs channel estimation across the total UL band.

If the cell-edge UE requests accurate channel estimation for a specific UL band, the eNB may determine a P value and configure the UE not to perform frequency hopping. The eNB enables combining according to the P value.

The best UE Tx beam/TRP Rx beam pairs may be determined by measuring a DL beam management RS, relying on reciprocity, determined based on a transmitted non-precoded SRS, or determined based on a previously transmitted UL beam management RS.

Figure 21:
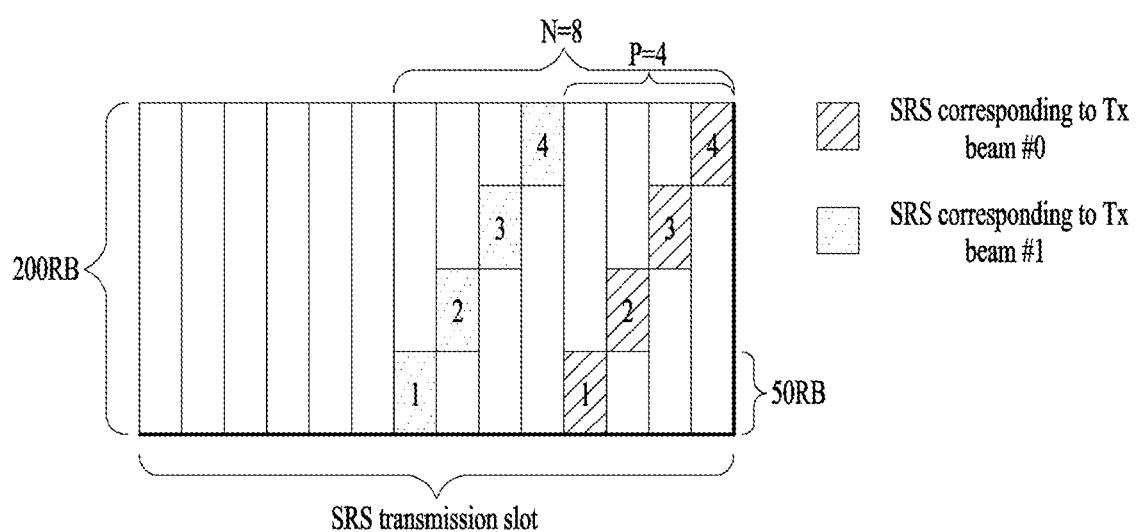
FIG. 21 is a diagram illustrating exemplary setting of N, P, and M values for channel estimation across a total UL band, for a cell-edge UE.

FIG. 21 is a diagram illustrating exemplary setting of N, P, and M values for channel estimation across a total UL band, for a cell-edge UE.

In FIG. 21, an exemplary hopping pattern is shown for use in the case where channel estimation across a total UL band is required for best UE Tx beam/TRP Rx beam pairs.

It is assumed that a UL BW of 50 RBs is available to a UE in a total UL band of 200 RBs based on link budget calculation in a network. If the quotient of dividing the available UL SRS BW by the total UL BW (e.g., 60 RBs) is not an integer, the eNB may set the UL SRS BW to 50 RBs. Herein, the UE reports its UE capability information index as '4' of [Table 13] (the maximum number of Tx ports is 4 at the UE and a combination of TDM and FDM is available for multiplexing between SRS resources) to the eNB. If the eNB configures P=200 RB/50 RB=4 for channel estimation across the total UL band, sets the number N of symbols for SRS transmission to 8 and the number M of SRS resources per SRS symbol to 1, for two best beam pairs, and indicates hopping pattern (e.g., frequency hopping pattern) index 0 in [Table 14] with respect to P, the UE may transmit an SRS in an SRS instance as illustrated in FIG. 20.

The eNB may indicate a frequency hopping pattern directly to the UE by a bitmap, or initialize the frequency hopping using based on a scramble seed. Accordingly, it may be configured that the eNB receives an SRS in four symbols by the best TRP Rx beam corresponding to best Tx beam #0, and in the next four symbols by the best TRP Rx beam corresponding to best Tx beam #1. [Table 14] lists exemplary (frequency) hopping patterns for P=4.

TABLE 14

| (frequency) Hopping pattern | Position index P = 4 |
|---|---|
| 0 | [1 2 3 4] |
| 1 | [2 1 3 4] |
| 2 | [3 4 2 1] |
| 3 | [4 1 3 2] |

Figure 22:
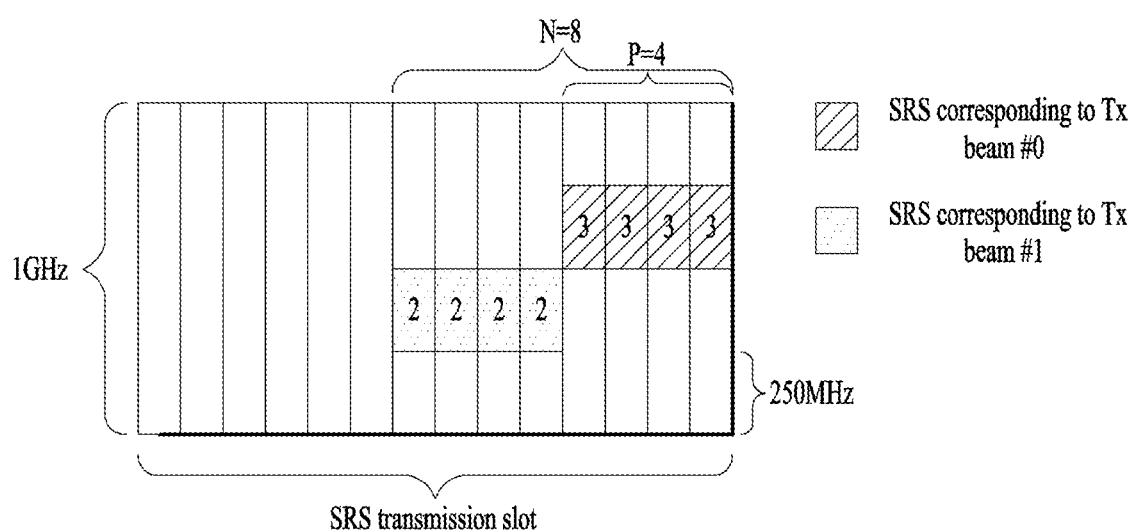
FIG. 22 is a diagram illustrating exemplary setting of N, P, and M values for increasing the performance of channel estimation in a specific UL resource area.

FIG. 22 is a diagram illustrating exemplary setting of N, P, and M values for increasing the performance of channel estimation in a specific UL resource area.

In FIG. 22, a specific UL band channel is enhanced for best UE Tx beam/TRP Rx beam pairs. For N=8 and P=4, the UE transmits an SRS in four symbols of SRS 3 areas (areas indicated by reference numeral '3' in FIG. 22) by an initial best UE Tx beam/TRP Rx beam pair, for increasing channel estimation performance, and in four symbols of SRS 2 areas (areas indicated by reference numeral '2' in FIG. 22) by the next initial best UE Tx beam/TRP Rx beam pair, for increasing channel estimation performance. For this configuration, a UE Tx beam/TRP Rx beam pair should be maintained according to a P value.

Proposal 5

The eNB may transmit the number N of SRS symbols, the number P of SRS symbols mapped to the same beam, and the number M of Tx ports per symbol in consideration of signaling overhead in one of the following options. In the case of aperiodic SRS triggering, the eNB may 1) transmit N, P, M, and Q in a DCI format, 2) transmit N by higher-layer signaling (e.g., RRC signaling) and P, M and Q in a DCI format, 3) transmit N and P by higher-layer signaling and only M and Q in a DCI format, 4) transmit N, P and M by higher-layer signaling and only Q in a DCI format, or 5) transmit subset Z (configurable) of W={N, P, M, Q} in a DCI format and subset W/Z by higher-layer signaling.

In the case of periodic SRS transmission, the eNB may 1) transmit N, P, M, and Q by higher-layer signaling, or 2) transmit subset Z (configurable) of W={N, P, M, Q} in a DCI format and subset W/Z by higher-layer signaling.

In the case of semi-persistent SRS transmission, the eNB may 1) transmit N, P, M, and Q in a MAC-CE, 2) transmit N by higher-layer signaling and P, M and Q in a MAC-CE, 3) transmit N and P by higher-layer signaling and M and Q in a MAC-CE, or 4) transmit N, P and M by higher-layer signaling and only Q in a MAC-CE. In 4), N, P and M may be used for the purpose of semi-persistent SRS activation, and an indication for deactivation may be transmitted in DCI or deactivation may be performed based on a timer. The eNB may 5) transmit subset Z (configurable) of W={N, P, M, Q} in a DCI format and subset W/Z by higher-layer signaling.

FIG. 23 is a diagram illustrating exemplary transmission configurations for N, P, M, and Q values.

In FIG. 23(a), the eNB (or gNB) may transmit N, P, M, and Q for aperiodic SRS configuration by a DCI format. The eNB may indicate SRS transmission by the DCI format and also transmit N, P, M, and Q by the DCI format. Each time an SRS is triggered, the eNB may transmit N0, P0, M0, and Q0 by a DCI format, and when the next SRS is triggered, the eNB may transmit N1, P1, M1, and Q1 by a DCI format. In FIG. 23(b), the eNB may transmit P, M, and Q for aperiodic SRS configuration by a DCI format.

In the proposals and embodiments of the present disclosure as described above, an eNB may indicate an SRS transmission in any of various manners by configuring the number of SRS symbols, the number of SRS symbols mapped to the same Tx beam, and the number of Tx ports per SRS symbol, for the SRS transmission, in consideration of a beamforming capability, a power transmission capability, and a wireless environment of a UE, reported by the UE.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of receiving SRS configuration information and the UE therefore are industrially applicable to various wireless communication systems such as a 3GPP LTE/LTE-A system, a 5G communication system, and so on.

The invention claimed is:

1. A method for transmitting a sounding reference signal (SRS) by a user equipment (UE), the method comprising:
    transmitting capability information of the UE, the capability information including a number of SRS resources which can be simultaneously transmitted by the UE;
    receiving resource information related to SRS resources which can be configured for simultaneous transmission; and
    transmitting the SRS on the SRS resources based on the resource information,
    wherein the SRS resources are allocated in a same orthogonal frequency division multiplexing (OFDM) symbol and a same resource block.

2. The method of claim 1, wherein the SRS resources are determined based on the capability information.

3. The method of claim 1, wherein the resource information is received via a higher layer signaling.

4. The method of claim 1, wherein a maximum number of the SRS resources which can be configured for the simultaneous transmission is 4.

5. The method according to claim 1, wherein the UE is communicable with at least one of another UE, a network, a base station, or an autonomous vehicle.

6. A method for receiving a sounding reference signal (SRS) by a base station, the method comprising:
    receiving capability information of a user equipment (UE), the capability information including a number of SRS resources which can be simultaneously transmitted by the UE;
    transmitting resource information related to SRS resources which can be configured for simultaneous transmission; and
    receiving the SRS on the SRS resources based on the resource information,
    wherein the SRS resources are allocated in a same orthogonal frequency division multiplexing (OFDM) symbol and a same resource block.

7. The method of claim 6,
    wherein the SRS resources are determined based on the capability information.

8. The method of claim 6, wherein a maximum number of the SRS resources which can be configured for the simultaneous transmission is 4.

9. A user equipment (UE) configured to transmit a sounding reference signal (SRS), the UE comprising:
    at least one transceiver;
    at least one processor; and
    at least one computer memory operably connectable to the at least one processor and storing instructions that, based on being executed by the at least one processor, perform operations comprising:
    transmitting, via the at least one transceiver, capability information of the UE, the capability information including a number of SRS resources which can be simultaneously transmitted by the UE;
    receiving, via the at least one transceiver, resource information related to SRS resources which can be configured for simultaneous transmission; and
    transmitting, via the at least one transceiver, the SRS on the SRS resources based on the resource information,
    wherein the SRS resources are allocated in a same orthogonal frequency division multiplexing (OFDM) symbol and a same resource block.

10. The UE of claim 9, wherein the SRS resources are determined based on the capability information.

11. The UE of claim 9, wherein a maximum number of the SRS resources which can be configured for the simultaneous transmission is 4.

12. A base station (BS) configured to transmit a sounding reference signal (SRS), the BS comprising:
- at least one transceiver;
- at least one processor; and
- at least one computer memory operably connectable to the at least one processor and storing instructions that, based on being executed by the at least one processor, perform operations comprising:
- receiving, via the at least one transceiver, capability information of a user equipment (UE), the capability information including a number of SRS resources which can be simultaneously transmitted by the UE;
- transmitting, via the at least one transceiver, resource information related to SRS resources which can be configured for simultaneous transmission; and
- receiving, via the at least one transceiver, the SRS on the SRS resources based on the resource information,
- wherein the SRS resources are allocated in a same orthogonal frequency division multiplexing (OFDM) symbol and a same resource block.

13. The BS of claim 12, wherein
the SRS resources are determined based on the capability information.

14. The BS of claim 12, wherein a maximum number of the SRS resources which can be configured for the simultaneous transmission is 4.

\* \* \* \* \*